United States Patent
Kubo et al.

(10) Patent No.: US 12,428,689 B2
(45) Date of Patent: *Sep. 30, 2025

(54) STEEL SHEET AND METHOD FOR MANUFACTURING SAME

(71) Applicant: NIPPON STEEL CORPORATION, Tokyo (JP)

(72) Inventors: Masahiro Kubo, Tokyo (JP); Hiroyuki Kawata, Tokyo (JP); Masahiro Saito, Tokyo (JP); Kenichiro Otsuka, Tokyo (JP); Masafumi Azuma, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 1003 days.

This patent is subject to a terminal disclaimer.

(21) Appl. No.: 17/420,088

(22) PCT Filed: Jan. 7, 2020

(86) PCT No.: PCT/JP2020/000134
§ 371 (c)(1),
(2) Date: Jan. 21, 2022

(87) PCT Pub. No.: WO2020/145256
PCT Pub. Date: Jul. 16, 2020

(65) Prior Publication Data
US 2022/0316020 A1    Oct. 6, 2022

(30) Foreign Application Priority Data
Jan. 7, 2019  (JP) ................ 2019-000672

(51) Int. Cl.
C21D 8/02        (2006.01)
C22C 38/04       (2006.01)
(Continued)

(52) U.S. Cl.
CPC ......... *C21D 8/0205* (2013.01); *C21D 8/0226* (2013.01); *C21D 8/0236* (2013.01);
(Continued)

(58) Field of Classification Search
CPC ......... C22C 38/04; C22C 38/12; C22C 38/14; C22C 38/54; C21D 2211/002; C21D 2211/008; C21D 8/0226; C21D 8/0236
See application file for complete search history.

(56) References Cited

U.S. PATENT DOCUMENTS 8,911,567 B2 * 12/2014 Ogawa ............... B32B 15/012
                                                        148/333
2015/0047751 A1   2/2015 Ono et al.
2020/0255931 A1 *  8/2020 Schier ............... C23C 14/0641

FOREIGN PATENT DOCUMENTS

EP    2 500 445 A1    9/2012
JP    2007-291514 A   11/2007
(Continued)

OTHER PUBLICATIONS

Milenin et al., "Model of residual stresses in hot-rolled sheets with taking into account relaxation process and phase transformation," Procedia Engineering, vol. 81, Oct. 15, 2014, pp. 108-113.

*Primary Examiner* — Anthony M Liang
(74) *Attorney, Agent, or Firm* — Birch, Stewart, Kolasch & Birch, LLP

(57) ABSTRACT

A steel sheet has a predetermined chemical composition, in which a metallographic structure in a surface layer region ranging from a surface to a position of 20 μm from the surface in a sheet thickness direction consists of ferrite and a secondary phase having a volume fraction of 0.01% to 5.0%, a metallographic structure in an internal region ranging from a position of more than 20 μm from the surface in the sheet thickness direction to a ¼thickness position from the surface in the sheet thickness direction consists of ferrite
(Continued)

and a secondary phase having a volume fraction of 2.0% to 10.0%, the volume fraction of the secondary phase in the surface layer region is less than the volume fraction of the secondary phase in the internal region, and in the surface layer region, an average grain size of the secondary phase is 0.01 μm to 4.0 μm, and a texture in which an $X_{ODF\{001\}/\{111\}}$ as the ratio of the intensity of {001} orientation to an intensity of {111} orientation in the ferrite is 0.60 or more and less than 2.00 is included.

16 Claims, 1 Drawing Sheet

(51) Int. Cl.
*C22C 38/12* (2006.01)
*C22C 38/14* (2006.01)
*C22C 38/54* (2006.01)

(52) U.S. Cl.
CPC ............ *C21D 8/0242* (2013.01); *C22C 38/04* (2013.01); *C22C 38/12* (2013.01); *C22C 38/14* (2013.01); *C22C 38/54* (2013.01); *C21D 2201/05* (2013.01); *C21D 2211/002* (2013.01); *C21D 2211/008* (2013.01)

(56) References Cited

FOREIGN PATENT DOCUMENTS

| | | |
|---|---|---|
| JP | 2009-132981 A | 6/2009 |
| JP | 2016-156079 A | 9/2016 |
| WO | WO 2013/046476 A1 | 4/2013 |

\* cited by examiner

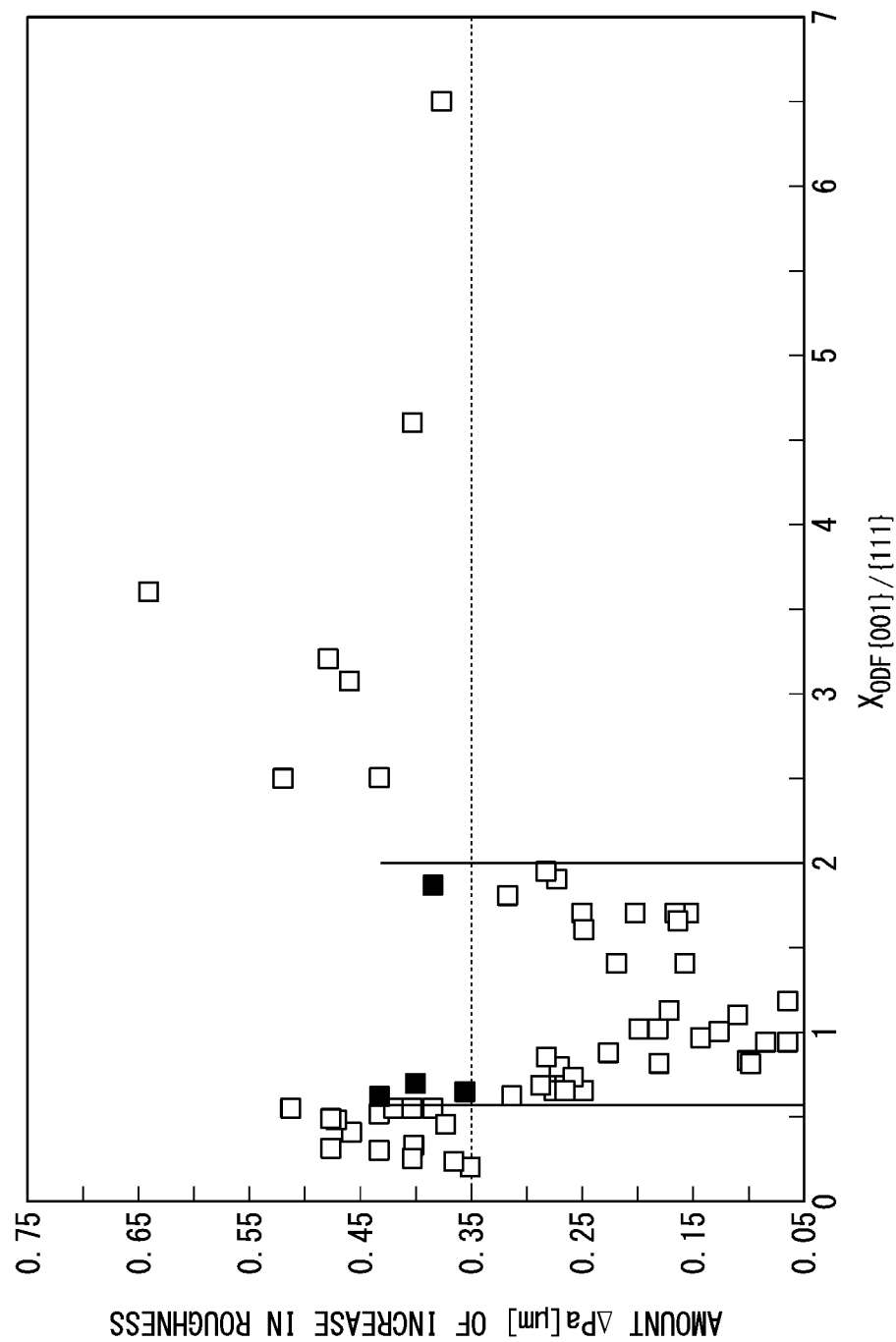

STEEL SHEET AND METHOD FOR MANUFACTURING SAME

TECHNICAL FIELD OF THE INVENTION

The present invention relates to a steel sheet and a method for manufacturing the same.

Priority is claimed on Japanese Patent Application No. 2019-000672, filed on Jan. 7, 2019, the content of which is incorporated herein by reference.

RELATED ART

Recently, in order to protect the global environment, it is desired to improve the fuel consumption of a vehicle. Regarding the improvement of the fuel consumption of a vehicle, high-strengthening is further required for a steel sheet for a vehicle in order to reduce the weight of a vehicle body while securing safety. This high-strengthening is required not only for a structural member such as a member or a pillar but also for an exterior component (for example, a roof, a hood, a fender, or a door) of a vehicle. For this requirement, a material has been developed in order to simultaneously achieve strength and elongation (formability).

On the other hand, the forming of an exterior component of a vehicle tends to become more complicated. When the thickness of a steel sheet is reduced through high-strengthening, a surface of the steel sheet is likely to be uneven during forming into a complicated shape. When the surface is uneven, the external appearance after forming deteriorates. Regarding an exterior panel component, not only characteristics such as strength but also design and surface quality are important. Therefore, the external appearance after forming is required to be excellent. The unevenness occurring after forming described herein refers to unevenness occurring on a surface of a formed component even when the steel sheet surface after manufacturing is not uneven. Even when the formability of the steel sheet is improved, the occurrence is not necessarily suppressed. Therefore, when a high strength steel sheet is applied to an exterior panel of a vehicle, there is a large problem.

Regarding a relationship between the external appearance after forming and material characteristics in a steel sheet to be applied to an exterior panel, for example, Patent Document 1 discloses a ferritic steel sheet in which, in order to improve surface properties after stretching, an area fraction of crystal having a crystal orientation of ±15° from {001} plane parallel to a steel sheet surface is 0.25 or less and an average grain size of the crystal is 25 µm or less.

However, Patent Document 1 relates to a ferritic steel sheet in which a C content is 0.0060% or less. For high-strengthening of a steel sheet, it is effective to increase the C content such that a dual phase structure including ferrite and a hard phase is obtained. However, as a result of an investigation by the present inventors, it was found that, when the C content is increased to obtain a dual phase structure, the area fraction of crystal having a crystal orientation of ±15° from {001} plane parallel to a steel sheet surface cannot be reduced unlike Patent Document 1. That is, with the method disclosed in Patent Document 1, the high-strengthening and the improvement of surface properties after working (suppression of the occurrence of unevenness) cannot be achieved simultaneously.

For example, Patent Document 2 discloses a dual phase structure steel including ferrite and a secondary phase, and states that it is effective to decrease the yield point as a countermeasure against surface strain during forming. However, Patent Document 2 does not disclose a relationship between the external appearance after forming and a structure from the viewpoint of a countermeasure against surface roughness or pattern.

That is, in the related art, a high-strength dual phase structure steel in which surface roughness or pattern defects after forming is improved is not disclosed.

PRIOR ART DOCUMENT

Patent Document

[Patent Document 1] Japanese Unexamined Patent Application, First Publication No. 2016-156079
[Patent Document 2] PCT International Publication No. WO2013/046476

DISCLOSURE OF THE INVENTION

Problems to be Solved by the Invention

The present invention has been made in consideration of the above-described problems. An object of the present invention is to provide: a high strength steel sheet in which the occurrence of surface unevenness during forming is suppressed; and a method for manufacturing the same.

Means for Solving the Problem

The present inventors conducted an investigation on a method for achieving the object. In particular, the present inventors conducted a thorough investigation on a relationship between surface unevenness in a manufactured steel sheet or surface unevenness after forming and a microstructure or a texture of the steel sheet and found that: i) unevenness after forming occurs even when unevenness does not occur on the steel sheet surface after manufacturing; ii) surface unevenness after forming occurs due to inhomogeneity of deformation in a range from the steel sheet surface to a position of 20 µm in the sheet thickness direction; and iii) the reason for the uneven deformation is non-uniform dispersion of a hard structure or development of a specific texture.

In addition, as a result of further investigation, the present inventors found that DP (dual phase) steel including ferrite and a secondary phase is preferable in order to simultaneously achieve strength and formability, and by adjusting the fraction of the secondary phase, the average grain size of the secondary phase, and the texture of ferrite in the metallographic structure in a surface layer region ranging from the surface to a range of 0 to 20 µm in the sheet thickness direction to be different from those in an internal region of the steel sheet, a steel sheet in which the occurrence of surface unevenness after forming is suppressed and the external appearance (surface appearance quality) after forming is excellent can be obtained, while securing strength.

In addition, as a result of investigation, the present inventors found that, in order to control the metallographic structure in the surface layer region, it is effective to apply strain after hot-rolling instead of after cold-rolling and to set a cold-rolling reduction and heat treatment conditions after the strain application depending on the working amount.

The present invention has been made based on the above findings, and the scope thereof is as follows.

(1) According to one aspect of the present invention, there is provided a steel sheet including, as a chemical composition, by mass %: C: 0.020% to 0.090%; Si: 0.200% or less; Mn: 0.45% to 2.10%; P: 0.030% or less; S: 0.020% or less; sol. Al: 0.50% or less; N: 0.0100% or less; B: 0% to 0.0050%; Mo: 0% to 0.40%; Ti: 0% to 0.10%; Nb: 0% to 0.10%; Cr: 0% to 0.55%; Ni: 0% to 0.25%; and a remainder of Fe and impurities, in which a metallographic structure in a surface layer region ranging from a surface to a position of 20 μm from the surface in a sheet thickness direction consists of ferrite and a secondary phase having a volume fraction of 0.01% to 5.0%, a metallographic structure in an internal region ranging from a position of more than 20 μm from the surface in the sheet thickness direction to a ¼ thickness position from the surface in the sheet thickness direction consists of ferrite and a secondary phase having a volume fraction of 2.0% to 10.0%, the volume fraction of the secondary phase in the surface layer region is less than the volume fraction of the secondary phase in the internal region, and in the surface layer region, the average grain size of the secondary phase is 0.01 μm to 4.0 μm, and the texture in which an $X_{ODF\{001\}/\{111\}}$ in as the ratio of an intensity of $\{001\}$ orientation to an intensity of $\{111\}$ orientation in the ferrite is 0.60 or more and less than 2.00 is included.

(2) In the steel sheet according to (1), the average grain size of the secondary phase in the internal region may be 1.0 μm to 5.0 μm and may be more than the average grain size of the secondary phase in the surface layer region.

(3) In the steel sheet according to (1) or (2), in a range of 0 μm to 50 μm from the surface in the sheet thickness direction in a cross section of the steel sheet orthogonal to a rolling direction, the average number density of the secondary phase per observed viewing field having a length of 100 μm in a sheet width direction and a length of 50 μm in the sheet thickness direction may be 130 or less, and the minimum number density of the secondary phase per the observed viewing field may be more than or equal to a value obtained by subtracting 20 from the average number density of the secondary phase.

(4) In the steel sheet according to any one of (1) to (3), the chemical composition may include, by mass %, one or more selected from the group consisting of: B: 0.0001% to 0.0050%; Mo: 0.001% to 0.40%; Ti: 0.001% to 0.10%; Nb: 0.001% to 0.10%; Cr: 0.001% to 0.55%; and Ni: 0.001% to 0.25%.

(5) In the steel sheet according to any one of (1) to (4), the secondary phase in the surface layer region may include one or more selected from the group consisting of martensite, bainite, and tempered martensite.

(6) In the steel sheet according to any one of (1) to (5), a plating layer may be provided on the surface.

(7) In the steel sheet according to any one of (1) to (6), a tensile strength may be 400 MPa or higher.

(8) According to another aspect of the present invention, there is provided a method for manufacturing a steel sheet including: a heating process of heating a slab having the chemical composition according to (1) at 1000° C. or higher; a hot-rolling process of hot-rolling the slab such that a rolling finishing temperature is 950° C. or lower to obtain a hot-rolled steel sheet; a stress application process of applying a stress to the hot-rolled steel sheet after the hot-rolling process such that an absolute value of a residual stress σs on a surface is 150 MPa to 350 MPa; a cold-rolling process of cold-rolling the hot-rolled steel sheet after the stress application process such that a cumulative rolling reduction $R_{CR}$ is 70% to 90% to obtain a cold-rolled steel sheet; an annealing process of heating the cold-rolled steel sheet such that an average heating rate in a range from 300° C. to a soaking temperature T1° C. that satisfies the following Expression (i) is 1.5° C./sec to 10.0° C./sec and holding the heated steel sheet at the soaking temperature T1° C. for 30 seconds to 150 seconds for annealing; and a cooling process of cooling the cold-rolled steel sheet after the annealing process to 550° C. to 650° C. such that an average cooling rate in a range from T1° C. to 650° C. is 1.0° C./sec to 10.0° C./sec and cooling the cooled steel sheet to 200° C. to 490° C. such that the average cooling rate is 5.0° C./sec to 500.0° C./sec.

$$1275-27-\ln(\sigma s)-4.5 \times R_{CR} \le T1 \le 1275-27 \times \ln(\sigma s)-6 \times R_{CR} \qquad (i)$$

(9) In the method for manufacturing a steel sheet according to (8), the stress application process may be performed at 40° C. to 500° C.

(10) In the method for manufacturing a steel sheet according to (8) or (9), in the hot-rolling process, a finish rolling start temperature may be 900° C. or lower.

(11) The method for manufacturing a steel sheet according to any one of (8) to (10) may further include a holding process of holding the cold-rolled steel sheet after the cooling process in a temperature range of 200° C. to 490° C. for 30 seconds to 600 seconds.

Effects of the Invention

In the steel sheet according to the aspect of the present invention, the occurrence of surface unevenness is suppressed even after various deformation during press forming as compared to a material in the related art. Therefore, the steel sheet according to the aspect of the present invention has excellent appearance quality of the surface and can contribute to improvement of the vividness and design of coating. In addition, the steel sheet according to the present invention has high strength and can contribute to further reduction in the weight of a vehicle. In the present invention, the high strength represents a tensile strength of 400 MPa or higher.

In addition, with the method for manufacturing a steel sheet according to the aspect of the present invention, a high strength steel sheet in which the occurrence of surface unevenness is suppressed even after various deformation during press forming can be manufactured.

BRIEF DESCRIPTION OF THE DRAWINGS

FIG. 1 is a diagram showing the effect of a texture parameter on surface appearance quality after forming, in which a solid square symbol of the plot represents an example of a range in which a fraction of a secondary phase in a surface layer is not preferable.

EMBODIMENTS OF THE INVENTION

A steel sheet according to an embodiment of the present invention (the steel sheet according to the embodiment) includes, as a chemical composition, by mass %: C: 0.020% to 0.090%; Si: 0.200% or less; Mn: 0.45% to 2.10%; P: 0.030% or less; S: 0.020% or less; sol. Al: 0.50% or less; and N: 0.0100% or less, and optionally further includes: B: 0.0050% or less; Mo: 0.40% or less; Ti: 0.10% or less; Nb: 0.10% or less; Cr: 0.55% or less; Ni: 0.25% or less; and a remainder of Fe and impurities.

In addition, in the steel sheet according to the embodiment, a metallographic structure in a surface layer region ranging from a surface to a position of 20 μm from the surface in a sheet thickness direction consists of ferrite and a secondary phase having a volume fraction of 0.01% to 5.0%, a metallographic structure in an internal region ranging from a position of more than 20 μm from the surface in the sheet thickness direction to a ¼ thickness position from the surface in the sheet thickness direction consists of ferrite and a secondary phase having a volume fraction of 2.0% to 10.0%, and the volume fraction of the secondary phase in the surface layer region is less than the volume fraction of the secondary phase in the internal region.

In addition, in the steel sheet according to the embodiment, in the surface layer region, an average grain size of the secondary phase is 0.01 μm to 4.0 μm, and a texture in which an $X_{ODF\{001\}/\{111\}}$ as the ratio of the intensity of $\{001\}$ orientation to an intensity of $\{111\}$ orientation in the ferrite is 0.60 or more and less than 2.00 is included.

In the steel sheet according to the embodiment, it is preferable that an average grain size of the secondary phase in the internal region is 1.0 μm to 5.0 μm and is more than the average grain size of the secondary phase in the surface layer region. In addition, it is preferable that, in a range of 0 μm to 50 μm from the surface in the sheet thickness direction in a cross section of the steel sheet orthogonal to a rolling direction, an average number density of the secondary phase per observed viewing field having a length of 100 μm in a sheet width direction and a length of 50 μm in the sheet thickness direction is 130 or less, and a minimum number density of the secondary phase per observed viewing field having a size of 100 μm×50 μm is more than or equal to a value obtained by subtracting 20 from the average number density of the secondary phase.

Hereinafter, the steel sheet according to the embodiment will be described in detail.

<Regarding Chemical Composition>

First, the reason for limiting the chemical composition of the steel sheet according to the embodiment will be described.

[C: 0.020% to 0.090%]

C (carbon) is an element that increases the strength of the steel sheet and is essential for securing the volume fraction of the secondary phase. In order to secure a predetermined volume fraction of the secondary phase, the C content is set to be 0.020% or more. The C content is preferably 0.030% or more.

On the other hand, when the C content is more than 0.090%, the number of hard phase (secondary phase) grains increases, and the hard phase is likely to be linked. A portion other than the linked hard phase is promoted to be deformed during forming. In a case where hard phase grains are non-uniformly dispersed, pattern defects are likely to be formed on the surface after forming. In addition, when the C content is more than 0.090%, a cold-rolling force during cold-rolling at a high rolling reduction increases, the productivity decreases, and the formability or weldability of the steel sheet deteriorates. Therefore, the C content is set to be 0.090% or less. The C content is preferably 0.070% or less and more preferably 0.060% or less.

[Si: 0.200% or less]

Si (silicon) is a deoxidizing element of steel that is effective for increasing the mechanical strength of the steel sheet. However, when the Si content is more than 0.200%, scale peelability during production deteriorates, and surface defects are likely to be formed on the product. In addition, a cold-rolling force during cold-rolling at a high rolling reduction increases, and the productivity decreases. Further, the weldability or the deformability of the steel sheet deteriorates. Therefore, the Si content is set to be 0.200% or less. The Si content is preferably 0.150% or less and more preferably 0.100% or less.

[Mn: 0.45% to 2.10%]

Mn (manganese) is an element that is effective for increasing the mechanical strength of the steel sheet. In addition, Mn is an element that immobilizes S (sulfur) in the steel as MnS or the like to prevent cracking during hot-rolling. In order to obtain the effects, the Mn content is set to be 0.45% or more.

On the other hand, when the Mn content is more than 2.10%, a cold-rolling force during cold-rolling at a high rolling reduction increases, and the productivity decreases. In addition, segregation of Mn is likely to occur. Therefore, the hard phase aggregates after annealing such that pattern defects are likely to be formed on the surface after forming. Therefore, the Mn content is set to be 2.10% or less. The Mn content is preferably 2.00% or lower.

[P: 0.030% or Less]

P (phosphorus) is an impurity. When an excess amount of P is included in the steel, cracking is promoted during hot-rolling or cold-rolling, and the weldability or ductility of the steel sheet deteriorates. Therefore, the P content is limited to 0.030% or less. It is preferable that the P content is limited to 0.020% or less. The P content is preferably small and may be 0%. In consideration of existing general refining (including secondary refining), the P content may be 0.0005% or more.

[S: 0.020% or Less]

S (sulfur) is an impurity. When an excess amount of S is included in the steel, MnS stretched by hot-rolling is formed, and the deformability of the steel sheet deteriorates. Therefore, the S content is limited to 0.020% or less. The S content is preferably small and may be 0%. In consideration of existing general refining (including secondary refining), the S content may be 0.0005% or more.

[Sol. Al: 0.50% or Less]

Al (aluminum) is a deoxidizing element of steel that is effective for increasing the mechanical strength of the steel sheet. In order to obtain the effect, the sol. Al content may be 0.10% or more. In a case where deoxidation is performed using Si, sol. Al does not need to be included.

On the other hand, when the sol. Al content is more than 0.50%, the castability deteriorates, and the productivity deteriorates. Therefore, the sol. Al content is set to be 0.50% or less.

[N: 0.0100% or Less]

N (nitrogen) is an impurity and is an element that deteriorates the deformability of the steel sheet. Accordingly, the N content is limited to 0.0100% or less. The N content is preferably small and may be 0%. However, in consideration of existing general refining (including secondary refining), the N content may be 0.0005% or more.

That is, the steel sheet according to the embodiment may include the above-described elements and a remainder consisting of Fe and impurities. However, in order to improve various characteristics, the following elements (optional elements) may be included instead of a part of Fe. From the viewpoint of reducing the alloy cost, it is not necessary to add the optional elements to the steel on purpose. Therefore, the lower limit of the amount of each of the optional elements is 0%.

The impurities refer to components that are unintentionally included from raw materials or other manufacturing processes in the process of manufacturing the steel sheet.

[B: 0% to 0.0050%]

B (boron) is an element that immobilizes carbon and nitrogen in the steel to form a fine carbonitride. The fine carbonitride contributes to precipitation hardening, microstructure control, grain refinement strengthening, and the like of the steel. Therefore, B may be optionally included. In order to obtain the effect, the B content is preferably 0.0001% or more.

On the other hand, when the B content is more than 0.0050%, the effect is saturated, and the workability (deformability) of the steel sheet may deteriorate. Therefore, even in a case where B is included, the B content is set to be 0.0050% or less. In addition, the strength of the cold-rolled original sheet increases by including B. Therefore, a cold-rolling force during cold-rolling at a high rolling reduction increases. Therefore, from the viewpoint of productivity, the B content is preferably 0.0005% or less.

[Mo: 0% to 0.40%]

Mo (molybdenum) is an element that contributes to the improvement of the mechanical strength of the steel sheet. In addition, in a case where the Mo content is less than the Mn content, Mo is an element that is less likely to segregate than Mn and contributes to uniform dispersion of the hard phase. Therefore, Mo may be optionally included. In order to obtain the effect, the Mo content is preferably 0.001% or more.

On the other hand, when the Mo content is excessively large, the deformability of the steel sheet may deteriorate. Therefore, even in a case where Mo is included, the Mo content is 0.40% or less. In addition, Mo is an expensive element, and an increase in Mo content increases an increase in alloy cost. From this viewpoint, the Mo content is preferably 0.15% or less.

[Ti: 0% to 0.10%]

Ti (titanium) is an element that immobilizes carbon and nitrogen in the steel to form a fine carbonitride. The fine carbonitride contributes to precipitation hardening, microstructure control, grain refinement strengthening, and the like of the steel. Therefore, Ti may be optionally included. In order to obtain this effect, the Ti content is preferably 0.001% or higher.

On the other hand, when the Ti content is more than 0.10%, the effect is saturated, the strength of the cold-rolled original sheet (steel sheet provided for cold-rolling) increases, and a cold-rolling force during cold-rolling at a high rolling reduction increases. Therefore, even in a case where Ti is included, the Ti content is 0.10% or less.

[Nb: 0% to 0.10%]

Nb (niobium) is an element that immobilizes carbon and nitrogen in the steel to form a fine carbonitride. The fine Nb carbonitride contributes to precipitation hardening, microstructure control, grain refinement strengthening, and the like of the steel. Therefore, Nb may be optionally included. In order to obtain the effect, the Nb content is preferably 0.001% or more.

On the other hand, when the Nb content is more than 0.10%, the effect is saturated, the strength of the cold-rolled original sheet increases, and a cold-rolling force during cold-rolling at a high rolling reduction increases. Therefore, even in a case where Nb is included, the Nb content is 0.10% or less.

[Cr: 0% to 0.55%]

Cr (chromium) is an element that contributes to the improvement of the mechanical strength of the steel sheet. Therefore, Cr may be optionally included. In order to obtain the effect, the Cr content is preferably 0.001% or more.

On the other hand, when the Cr content is excessively large, the strength of the cold-rolled original sheet increases, and a cold-rolling force during cold-rolling at a high rolling reduction increases. In addition, excessive inclusion of Cr causes an increase in alloy cost. Therefore, even in a case where Cr is included, the Cr content is 0.55% or less.

[Ni: 0% to 0.25%]

Ni (nickel) is an element that contributes to the improvement of the mechanical strength of the steel sheet. Therefore, Ni may be optionally included. In order to obtain the effect, the Ni content is preferably 0.001% or more.

On the other hand, when the Ni content is excessively large, the strength of the cold-rolled original sheet increases, and a cold-rolling force during cold-rolling at a high rolling reduction increases. In addition, excessive inclusion of Ni causes an increase in alloy cost. Therefore, even in a case where Ni is included, the Ni content is 0.25% or less.

<Metallographic Structure of Surface Layer Region>

In the steel sheet according to the embodiment, when the sheet thickness is represented by t, the depth range from the surface to t/4 in a sheet thickness direction is divided into two regions, a depth range from the surface as a starting point to a depth position of 20 μm in a depth direction as an end point is represented by a surface layer region, and a range over the surface layer region to a center side of the steel sheet is represented by an internal region.

As a result of a thorough investigation by the present inventors, it was found that the surface unevenness during forming occurs due to inhomogeneous deformation occurs during forming caused by inhomogeneity in strength in a microscopic region. In particular, it was found that the occurrence of the unevenness of the surface is largely affected by the metallographic structure in the surface layer region ranging from the surface to a range of 0 to 20 μm in the sheet thickness direction (range from the surface to a position of 20 μm in the sheet thickness direction). Therefore, in the steel sheet according to the embodiment, the metallographic structure in the surface layer region is controlled as follows.

[Consisting of Ferrite and Secondary Phase Having Volume Fraction of 0.01% to 5.0% and Volume Fraction of Secondary Phase being Less than Volume Fraction of Secondary Phase in Internal Region]

When the volume fraction of the secondary phase in the surface layer region is less than 0.01%, the strength of the steel sheet is not sufficiently improved. Therefore, the volume fraction of the secondary phase is set to be 0.01% or more.

On the other hand, when the volume fraction of the secondary phase is more than 5.0%, the hard phase is likely to be non-uniformly dispersed. Therefore, surface unevenness occurs during forming, and the external appearance after forming deteriorates.

In addition, the volume fraction of the secondary phase in the metallographic structure of the surface layer region is set to be less than the volume fraction of the secondary phase in the internal region. By setting the volume fraction of the secondary phase in the surface layer to be less than the volume fraction of the secondary phase in the internal region and further increasing the volume fraction in the internal region, the suppression of the occurrence of the surface unevenness and the material strength can be achieved simultaneously.

In the steel sheet according to the embodiment, the secondary phase is a hard structure other than ferrite and is, for example, one or more among pearlite, martensite, residual austenite, bainite, and tempered martensite. From the viewpoint of improving strength, one or more among martensite, bainite, and tempered martensite is preferable, and martensite is more preferable.

The volume fraction of the secondary phase in the surface layer region can be obtained using the following method.

A sample (the size is substantially 20 mm in the rolling direction×20 mm in the width direction×the thickness of the steel sheet) for metallographic structure (microstructure) observation is collected from a W/4 position or a 3W/4 position of a sheet width W of the obtained steel sheet (that is, an end portion of the steel sheet in the width direction to the W/4 position in the width direction), and a metallographic structure (microstructure) in a range from the surface layer to the ¼ thickness position is observed using an optical microscope to calculate the area fraction of the secondary phase in a range from the surface of the steel sheet (in a case where a plating layer is present, the surface excluding the plating layer) to 20 µm. In order to prepare the sample, a sheet thickness cross section in a direction orthogonal to the rolling direction is polished as an observation section and is etched with the LePera reagent.

"Microstructures" are classified based on an optical microscope image at a magnification by 500-times obtained after etching with the LePera reagent. When the optical microscope observation is performed after the LePera corrosion, the respective structures are observed with different colors, for example, bainite is observed to be black, martensite (including tempered martensite) is observed to be white, and ferrite is observed to be gray. Therefore, ferrite and other hard structures can be easily distinguished from each other. In the structure image, a region other than gray representing ferrite is the secondary phase.

A region ranging from the surface layer to a ¼ thickness position in the steel sheet etched with the LePera reagent is observed in 10 viewing fields at a magnification by 500-times, a region from the surface layer to a position of 20 µm of the steel sheet in the structure image is designated, and the image analysis is performed using image analysis software "Photoshop CS5" (manufactured by Adobe Inc.) to obtain the area fraction of the secondary phase. In an image analysis method, for example, a maximum luminosity value Lmax and a minimum luminosity value Lmin of the image are acquired from the image, a portion that has pixels having a luminosity of Lmax−0.3×(Lmax−Lmin) to Lmax is set as a white region, a portion that has pixels having a luminosity of Lmin to Lmin+0.3×(Lmax−Lmin) is set as a black region, a portion other than the white and black regions is set as a gray region, and the area fraction of the secondary phase that is the region other than gray is calculated. By performing the image analysis as described above in 10 viewing fields in total, the area fraction of the secondary phase is measured. Assuming that the area fraction is the same as the volume fraction, the average of the area fraction values was calculated as the volume fraction of the secondary phase in the surface layer region.

[Average Grain Size of Secondary Phase being 0.01 to 4.0 µm]

When the average grain size of the secondary phase is more than 4.0 µm, the external appearance after forming deteriorates. Therefore, the average grain size of the secondary phase in the surface layer region is set to be 4.0 µm or less.

On the other hand, when the average grain size of the secondary phase is less than 0.01 µm, grains of the secondary phase are likely to aggregate. Even in a case where individual grains of the secondary phase are fine, when the grains aggregate, the external appearance after forming deteriorates. Therefore, the average grain size of the secondary phase is set to be 0.01 µm or more. The average grain size is preferably 0.10 µm or more.

The average grain size of the secondary phase in the surface layer region can be obtained using the following method.

Using the same method as described above, a region ranging from the surface layer to a ¼ thickness position in the steel sheet etched with the LePera reagent is observed in 10 viewing fields at a magnification by 500-times, a region from the surface layer to a position of 20 µm×200 µm of the steel sheet in the structure image is selected, and the image analysis is performed using image analysis software "Photoshop CS5" (manufactured by Adobe Inc.) to calculate the area of the secondary phase and the number of grains of the secondary phase, respectively. By adding up the values and dividing the area of the secondary phase by the number grains of the secondary phase, the average area per grain of the secondary phase is calculated. The circle equivalent diameter is calculated based on the area and the number of grains to obtain the average grain size of the secondary phase.

[Texture in which $X_{ODF\{001\}/\{111\}}$ as Ratio of Intensity of {001} Orientation to Intensity of {111} Orientation in Ferrite is 0.60 or More and Less than 2.00 being Included in Surface Layer Region]

When a texture in which an $X_{ODF\{001\}/\{111\}}$ as the ratio of the intensity of {001} orientation to an intensity of {111} orientation in the ferrite (ratio between maximum values of X-ray random intensity ratios) is 0.60 or more and less than 2.00 is included in the surface layer region, the external appearance after forming is improved. The reason for this is not clear but is presumed to be that the inhomogeneous deformation on the surface is suppressed due to an interaction between the existence form of the secondary phase and the crystal orientation distribution of ferrite.

When $X_{ODF\{001\}/\{111\}}$ is less than 0.60, inhomogeneous deformation caused by an orientation distribution and a difference in intensity of each the crystal of the material (steel sheet) is likely to occur, and deformation concentration on the orientation in the vicinity of {001} in ferrite is significant.

On the other hand, it is presumed that, when $X_{ODF\{001\}/\{111\}}$ is 2.00 or more, inhomogeneous deformation caused by an orientation distribution and a difference in intensity of each the crystal of the material (steel sheet) is likely to occur, inhomogeneous deformation is likely to occur in a boundary between ferrite and the secondary phase and a boundary between crystal grains in an orientation in the vicinity of {111} and crystal grains in another orientation in ferrite, and surface unevenness is likely to occur.

In addition, it is more preferable that a difference between $X_{ODF\{001\}/\{111\}}$ of ferrite in the surface layer region and $X_{ODF\{001\}/\{111\}}$ of ferrite in the internal region is −0.40 to 0.40 because inhomogeneous deformation in the ferrite in the sheet thickness direction is suppressed, and contributes to the improvement of strain hardening property of the material.

Whether or not the texture in which $X_{ODF\{001\}/\{111\}}$ is 0.60 to 2.00 is included in ferrite of the surface layer region can be determined in the following manner using EBSD (Electron Backscattering Diffraction) method.

Regarding a sample provided for EBSD method, the steel sheet is polished by mechanical grinding, strain is removed by chemical polishing or electrolytic polishing, the sample is prepared such that the cross section in the sheet thickness direction including the range from the surface to the ¼ thickness position is a measurement surface, and the texture is measured. Regarding a sample collection position in the sheet width direction, it is desirable to collect the sample in the vicinity of a sheet width position of W/4 or 3W/4 (position at a distance of ¼ from an end surface of the steel sheet in the sheet width direction).

In the region of the sample ranging from the surface of the steel sheet to 20 μm in the sheet thickness direction, a crystal orientation distribution is measured by EBSD method at a pitch of 0.5 μm or less. Ferrite is extracted using an IQ (Image Quality) map that is analyzable by EBSP-OIM (registered trade name, Electron Backscatter Diffraction Pattern-Orientation Image Microscopy). Ferrite has a characteristic in that the IQ value is high, and thus can be simply classified using this method. The threshold of the IQ value is set such that the area fraction of ferrite that is calculated by the observation of the microstructure obtained by the LePera corrosion matches the area fraction of ferrite calculated based on the IQ value.

In a cross section of $\phi 2=45°$ in a three-dimensional texture (ODF: Orientation Distribution Functions) calculated using crystal orientations of the extracted ferrite, a ratio of a maximum value of X-ray random intensity ratios of a {001} orientation group to a maximum value of X-ray random intensity ratios of a {111} orientation group (γ-fiber) (the maximum value of X-ray random intensity ratios of {001} orientation group/the maximum value of X-ray random intensity ratios of {111} orientation group (γ-fiber)) is obtained as $X_{ODF\{001\}/\{111\}}$. The X-ray random intensity ratio is a numerical value obtained by measuring the diffraction intensity of a standard sample having no pile-up in a specific orientation and the diffraction intensity of a sample material by X-ray diffraction under the same conditions and dividing the obtained diffraction intensity of the sample material by the diffraction intensity of the standard sample. For example, in a case where the steel sheet is rolled at a high rolling reduction of 70% or higher and annealed, the texture is developed, and the X-ray random intensity of the {111} orientation group (γ-fiber) increases.

Here, {hk1} represents that, when a sample is collected using the above-described method, the normal direction of a sheet surface is parallel to <hk1>. Regarding the crystal orientation, typically, an orientation orthogonal to a sheet surface is represented by (hk1) or {hk1}. {hk1} is a generic term for equivalent planes, and (hk1) represents each of crystal planes. That is, in the embodiment, a body-centered cubic structure (bcc structure) is targeted. Therefore, for example, the respective planes (111), (-111), (1-11), (11-1), (-1-11), (-11-1), (1-1-1), and (-1-1-1) are equivalent and cannot be distinguished from each other. In this case, these orientations are collectively referred to as "{111} orientation group". The ODF representation is used for representing other orientations of a crystal structure having low symmetry. Therefore, in the ODF representation, each of orientations is generally represented by (hk1)[uvw]. However, in the embodiment, attention is paid to the normal direction orientation {hk1} from which the finding that the normal direction orientation of a sheet surface has a large effect on the development of unevenness was obtained. {hkl} and (hk1) have the same definition.

In a case where the product is a steel sheet including a plating layer, the surface of the steel sheet excluding the plating layer is defined as an origin of the surface layer region.

<Regarding Metallographic Structure in Internal Region>

In the steel sheet according to the embodiment, it is necessary that, in a state where the metallographic structure in the surface layer region is controlled as described above, a metallographic structure in an internal region ranging from a position of more than 20 μm from the surface in the sheet thickness direction to a ¼ thickness position (in a case where the sheet thickness is represented by t: t/4) from the surface in the sheet thickness direction is also controlled.

[Consisting of Ferrite and Secondary Phase Having Volume Fraction of 2.0% to 10.0%]

When the volume fraction of the secondary phase in the internal region is less than 2.0%, the strength of the steel sheet cannot be sufficiently improved. Therefore, the volume fraction of the secondary phase is set to be 2.0% or more.

On the other hand, when the volume fraction of the secondary phase is more than 10.0%, the volume fraction of ferrite decreases excessively, and workability such as elongation or hole expansibility deteriorates. Therefore, the volume fraction of the secondary phase is set to be 10.0% or less.

[Average Grain Size of Secondary Phase being 1.0 μm to 5.0 μm and being More than Average Grain Size of Secondary Phase in Surface Layer Region]

When the average grain size of the secondary phase in the internal region is 1.0 μm to 5.0 μm and is more than an average grain size of the secondary phase in the surface layer region, the average grain size of the secondary phase in the surface layer region is less than that in the internal region and inhomogeneous deformation in the surface layer region is suppressed, which is preferable.

Therefore, the average grain size in the internal region may be controlled to be in the above-described range.

The volume fraction and the average grain size of the secondary phase in the internal region can be obtained by using a steel sheet etched with the LePera reagent, selecting a range from a position of more than 20 μm from the surface of the sample in the sheet thickness direction to a ¼ thickness position, and analyzing the range with the same method as that of the surface layer region.

In addition, a texture of ferrite in the internal region can be obtained by selecting a range from a position of more than 20 μm from the surface of the sample in the sheet thickness direction to a ¼ thickness position by the above-described EBSD method and analyzing the range with the same method as that of the surface layer region.

When the thickness of the product is more than 0.4 mm, it is preferable that the internal region is a range from a position of more than 20 μm from the surface in the sheet thickness direction to 100 μm.

<Other Structures>

In a range of 0 μm to 50 μm from the surface in the sheet thickness direction in a cross section of the steel sheet orthogonal to the rolling direction, when the number density of grains of the secondary phase and an unevenness in the number density are controlled to be in the following range, the external appearance after forming is further improved, which is preferable. The uniform dispersibility of the hard phase affects the occurrence of unevenness patterns caused by the occurrence of inhomogeneous deformation during forming in a wider region in the sheet thickness direction than the crystal orientation or the microstructural fraction. Therefore, the uniform dispersibility of the hard phase is controlled in a range of 0 to 50 μm from the surface that is wider than that in the surface layer region (0 to 20 μm from the surface) in the sheet thickness direction.

[Average Number Density of Secondary Phase Per Observed Viewing Field of 100 μm (Sheet Width Direction)×50 μm (Sheet Thickness Direction) being 130 or Less]

[Minimum Number Density of Secondary Phase per the Observed Viewing Field of 100 μm (Sheet Width Direction)×50 μm (Sheet Thickness Direction) being more than or equal to Value obtained by subtracting 20 from Average Number Density of Secondary Phase]

In a case where the average number density of the secondary phase is more than 130/viewing field when 10 or more viewing fields having a size of 100 μm (sheet width direction)×50 μm (sheet thickness direction) in a cross section of the steel sheet orthogonal to the rolling direction are observed, hard grains are likely to be non-uniformly dispersed, and the external appearance after forming may deteriorate. In addition, when the minimum number density of the secondary phase is less than a value obtained by subtracting 20 from the average number density of the secondary phase (there is an unevenness in number density), inhomogeneous deformation in which deformation concentrates on a position where a number grains of the hard phase are small, and thus the external appearance after forming may deteriorate. Therefore, it is preferable that the average number density in the observed viewing field is 130 or less and the difference between the minimum number density and the average number density is less than 20 (the minimum number density is less than or equal to a value obtained by subtracting 20 from the average number density).

The number density of the grains of the secondary phase and the unevenness in the number density in the range of 0 to 50 μm from the surface in the sheet thickness direction can be obtained by using a steel sheet etched with the LePera reagent, designating 10 or more observed viewing fields of 100 μm (sheet width direction)×50 μm (sheet thickness direction) in a range from the surface of the sample to a position of 50 μm from the surface in the sheet thickness direction, and counting the number of grains of the secondary phase in the observed viewing fields.

The average number density of the secondary phase is the average value of the numbers of grains of the secondary phase measured in the 10 or more viewing fields. The minimum number density of the secondary phase is the minimum number density among the measured numbers of grains, and in a case where the average number density of the secondary phase in the observed viewing fields (100 μm×50 μm) is 20 or less, the minimum number density may be 0 or more.

<Regarding Plating Layer>

The steel sheet according to the embodiment may include a plating layer on the surface (on the surface of the steel sheet). By including the plating layer on the surface, corrosion resistance is improved, which is preferable.

A plating to be applied is not particularly limited, and examples thereof include hot-dip galvanizing, hot-dip galvannealing, electrogalvanizing, Zn—Ni plating (electrogalvanizing), Sn plating, Al—Si plating, electrogalvannealing, hot-dip zinc-aluminum alloy plating, hot-dip zinc-aluminum-magnesium alloy plating, hot-dip zinc-aluminum-magnesium alloy-Si plating, and zinc-Al alloy deposition.

<Regarding Sheet Thickness>

The thickness of the steel sheet according to the embodiment is not particularly limited. However, in a case where the steel sheet is applied to an exterior member, when the sheet thickness is more than 0.55 mm, the contribution to a reduction in the weight of the member is small. In addition, when the sheet thickness is less than 0.15 mm, there may be a problem in rigidity. Therefore, the sheet thickness is preferably 0.15 mm to 0.55 mm.

<Regarding Manufacturing Method>

Next, a preferable method for manufacturing the steel sheet according to the embodiment will be described. The effects can be obtained as long as the steel sheet according to the embodiment has the above-described characteristics irrespective of the manufacturing method. However, with the following method, the steel sheet can be stably manufactured, which is preferable.

Specifically, the steel sheet according to the embodiment can be manufactured with a manufacturing method including the following processes (i) to (vi).

(i) A heating process of heating a slab having the above-described chemical composition at 1000° C. or higher.

(ii) A hot-rolling process of hot-rolling the slab such that a rolling finishing temperature is 950° C. or lower to obtain a hot-rolled steel sheet.

(iii) A stress application process of applying a stress to the hot-rolled steel sheet after the hot-rolling process such that an absolute value of a residual stress ns on a surface is 150 MPa to 350 MPa.

(iv) A cold-rolling process of cold-rolling the hot-rolled steel sheet after the stress application process such that a cumulative rolling reduction $R_{CR}$ is 70% to 90% to obtain a cold-rolled steel sheet.

(v) An annealing process of heating the cold-rolled steel sheet such that an average heating rate in a range from 300° C. to a soaking temperature T1° C. that satisfies the following Expression (1) is 1.5° C./sec to 10.0° C./sec and holding the heated steel sheet at the soaking temperature T1° C. for 30 seconds to 150 seconds for annealing.

$$1275-27\times\ln(\sigma s)-4.5\times R_{CR} \leq T1 \leq 1275-27\times\ln(\sigma s)-4R_{CR} \quad (1)$$

(vi) A cooling process of cooling the cold-rolled steel sheet after the annealing process to a temperature range of 550° C. to 650° C. such that an average cooling rate in a range from T1° C. to 650° C. is 1.0° C./sec to 10.0° C./sec and further cooling the cooled steel sheet to a temperature range of 200° C. to 490° C. such that the average cooling rate is 5.0° C./sec to 500.0° C./sec.

In addition, in a case where ductility is improved by tempering martensite such that a cold-rolled steel sheet or a plated steel sheet having higher formability is obtained, the manufacturing method may further include the following process.

(vii) A holding process of holding the cold-rolled steel sheet after the cooling process in a temperature range of 200° C. to 490° C. for 30 seconds to 600 seconds.

The each process will be described.

[Heating Process]

In the heating process, a slab having the predetermined chemical composition is heated to 1000° C. or higher before rolling. When the heating temperature is lower than 1000° C., a rolling reaction force during hot-rolling increases, sufficient hot-rolling cannot be performed, and there may be a case where the desired thickness of the product cannot be obtained. Alternatively, there may a concern that the steel sheet cannot be coiled due to deterioration in the sheet shape.

It is not necessary to limit the upper limit of the heating temperature, and it is not preferable that the heating temperature is excessively high from the viewpoint of economy. Due to this reason, it is desirable that the upper limit of the slab heating temperature is lower than 1300° C.

In addition, the slab provided for the heating process is not limited. For example, a slab that is manufactured using a continuous casting method after preparing molten steel having the above-descried chemical composition using an converter or an electric furnace can be used. For example, an ingot-making method or a thin slab casting method may be adopted instead of the continuous casting method.

[Hot-Rolling Process]

In the hot-rolling process, the slab heated to 1000° C. or higher in the heating process is hot-rolled and coiled to obtain a hot-rolled steel sheet.

When the rolling finishing temperature is higher than 950° C., the average grain size excessively increases. In this case, the average grain size of the final product sheet increases, and an increase in average grain size causes a decrease in yield strength and deterioration in the surface appearance quality after forming, which is not preferable. Therefore, the finish rolling temperature (finish rolling finishing temperature) is set to be 950° C. or lower. The finish rolling start temperature is preferably 900° C. or lower.

When a temperature change (finish rolling finishing temperature–finish rolling start temperature) in the hot-rolling process is +5° C. or higher, recrystallization is promoted by deformation heating in the hot-rolling process, and crystal grains are refined, which is preferable.

In addition, in order to refine crystal grains, the coiling temperature is preferably 750° C. or lower and more preferably 650° C. or lower. In addition, from the viewpoint of reducing the strength of the cold-rolled original sheet, the coiling temperature is preferably 450° C. or higher and more preferably 500° C. or higher.

[Stress Application Process]

In the stress application process, a stress is applied to the hot-rolled steel sheet after the hot-rolling process such that an absolute value of a residual stress as on a surface is 150 MPa to 350 MPa. For example, a stress can be applied by grinding the hot-rolled steel sheet using a surface grinding brush after hot-rolling or pickling. At that time, while changing a contact pressure of the grinding brush on the steel sheet surface, a surface layer residual stress is measured on-line using a portable X-ray residual stress analyzer and may be controlled to be in the above-described range.

By performing predetermined cold-rolling, annealing, and cooling in a state where the residual stress is applied to the surface to be in the above-described range, a steel sheet including ferrite having a predetermined texture and having a predetermined hard phase distribution can be obtained.

When the residual stress is lower than 150 MPa or higher than 350 MPa, the predetermined texture of ferrite cannot be obtained after cold-rolling, annealing, and cooling to be performed after the stress application. In addition, in a case where the residual stress is applied after cold-rolling instead of after hot-rolling, the residual stress is widely distributed in the sheet thickness direction. Therefore, the predetermined hard phase distribution and the texture cannot be obtained only on the surface layer of the material.

A method for applying the residual stress to the surface of the hot-rolled steel sheet is not limited to the above-described grinding brush. For example, a method for performing shot blasting may also be used. In the case of shot blasting, fine unevenness may occur on the surface due to collision with shot media, or shot media may be trapped and cause defects during the next cold-rolling or the like. Therefore, the method for applying the stress by grinding using a brush is preferable.

In addition, during rolling using a roll such as a skin pass, a stress is applied to the entire steel sheet in the thickness direction and the desired hard phase distribution and the texture cannot be obtained only on the surface layer of the material.

It is preferable that the stress application process is performed at a steel sheet temperature of 40° C. to 500° C. By performing the stress application process in this temperature range, the residual stress can be efficiently applied to the range corresponding to the surface layer region, and the cracking caused by the residual stress of the hot-rolled steel sheet can be suppressed.

[Cold-Rolling Process]

In the cold-rolling process, the hot-rolled steel sheet is cold-rolled such that a cumulative rolling reduction $R_{CR}$ is 70% to 90% to obtain a cold-rolled steel sheet. By cold-rolling the hot-rolled steel sheet to which the predetermined residual stress is applied at the above-described cumulative rolling reduction, ferrite having the predetermined texture can be obtained after annealing and cooling.

When the cumulative rolling reduction is less than 70%, the texture of the cold-rolled sheet (cold-rolled steel sheet) is not sufficiently developed. Therefore, the predetermined texture cannot be obtained after annealing. In addition, when the cumulative rolling reduction is more than 90%, the texture of the cold-rolled sheet is excessively developed. Therefore, the predetermined texture cannot be obtained after annealing. In addition, the rolling force increases, and the uniformity of the material in the sheet width direction deteriorates. Further, the production stability also deteriorates. Therefore, the cumulative rolling reduction $R_{CR}$ during cold-rolling is set to be 70% to 90%.

[Annealing Process]

In the annealing process, the cold-rolled steel sheet is heated to the soaking temperature at the average heating rate corresponding to the residual stress applied in the stress application process and the cumulative rolling reduction in the cold-rolling process, and is held at the soaking temperature corresponding to the residual stress applied in the stress application process and the cumulative rolling reduction in the cold-rolling process.

Specifically, in the annealing process, the cold-rolled steel sheet is heated such that an average heating rate in a range from 300° C. to a soaking temperature T1° C. that satisfies the following Expression (1) is 1.5° C./sec to 10.0° C./sec and holding the heated steel sheet at the soaking temperature T1° C. for 30 seconds to 150 seconds for annealing.

$$1275-27\times\ln(\sigma s)-4.5\times R_{CR} \leq T1 \leq 1275-27\times\ln(\sigma s)-4\times R_{CR} \quad (1)$$

When the average heating rate is slower than 1.5° C./sec, a long period of time is required for heating, and the productivity deteriorates, which is not preferable. In addition, when the average heating rate is faster than 10.0° C./sec, the uniformity of the temperature in the sheet width direction deteriorates, which is not preferable.

In addition, when the soaking temperature T1 is lower than $1275-27\times\ln(\sigma s)-4.5\times R_{CR}$, although recrystallization of ferrite and reversible transformation from ferrite to austenite do not sufficiently progress, and the predetermined texture cannot be obtained. In addition, inhomogeneous deformation during forming is promoted due to a difference in strength between non-recrystallized crystal grains and recrystallized crystal grains, which is not preferable. In addition, when the soaking temperature is higher than $1275-27\times\ln(\sigma s)-4\times R_{CR}$, although recrystallization of ferrite and reversible transformation from ferrite to austenite sufficiently progresses, crystal grains are coarsened, and the predetermined texture cannot be obtained, which is not preferable.

The average heating rate can be obtained from (Heating End Temperature−Heating Start Temperature)/(Heating Time).

[Cooling Process]

In the cooling process, the cold-rolled steel sheet after soaking in the annealing process is cooled. During cooling, the cold-rolled steel sheet is cooled to 550° C. to 650° C. such that an average cooling rate in a range from T1° C. to 650° C. is 1.0° C./sec to 10.0° C./sec and is cooled to 200° C. to 490° C. such that the average cooling rate is 5.0° C./sec to 500.0° C./sec.

When the average cooling rate in a range from T1° C. to 650° C. is slower than 1.0° C./sec, ferritic transformation is excessively promoted, and the predetermined volume fraction of the secondary phase cannot be obtained. On the other hand, when the average cooling rate in a range from T1° C. to 650° C. is faster than 10.0° C./sec, ferritic transformation do not sufficiently progress, and concentration of carbon on austenite does not sufficiently progress. Therefore, the predetermined volume fraction of the secondary phase cannot be obtained.

In addition, when the average cooling rate from this temperature range to a temperature range of 200° C. to 490° C. after cooling is performed in a temperature range of 550° C. to 650° C. is slower than 5.0° C./sec, ferritic transformation is excessively promoted. Therefore, the predetermined volume fraction of the secondary phase cannot be obtained. On the other hand, it is difficult to set the average cooling rate to be faster than 500.0° C./sec due to the facility restriction. Therefore, the upper limit may be 500.0° C./sec.

The average cooling rate can be obtained from (Cooling Start Temperature−Cooling End Temperature)/(Cooling Time).

[Holding Process]

The cold-rolled steel sheet that is cooled to 200° C. to 490° C. may be held in the temperature range of 200° C. to 490° C. for 30 to 600 seconds.

By holding the cold-rolled steel sheet in the temperature range for the predetermined time, the effect of improving ductility through tempering martensite can be obtained, which is preferable.

The cold-rolled steel sheet that is cooled to 200° C. to 490° C. or the cold-rolled steel sheet after the holding process may be cooled to room temperature at 10° C./sec or faster.

A plating process of forming a plating layer on the surface may be further performed on the cold-rolled steel sheet obtained using the above-described method. Examples of the plating process include the following process.

[Electroplating Process]

[Galvannealing Process]

The cold-rolled steel sheet after the cooling process or the holding process may be electroplated to form an electroplating layer on the surface. An electroplating method is not particularly limited. The electroplating method may be determined depending on required characteristics (for example, corrosion resistance or adhesion).

In addition, after electroplating, the cold-rolled steel sheet may be heated to alloy plating metal.

[Hot-Dip Galvanizing Process]

[Galvannealing Process]

The cold-rolled steel sheet after the cooling process or the holding process may be hot-dip galvanized to form a hot-dip galvanized layer on the surface. A hot-dip galvanizing method is not particularly limited. The hot-dip galvanizing method may be determined depending on required characteristics (for example, corrosion resistance or adhesion).

In addition, the cold-rolled steel sheet after hot-dip galvanizing may be heat-treated to alloy a plating layer. In a case where alloying is performed, it is preferable that the cold-rolled steel sheet is heat-treated in a temperature range of 400° C. to 550° C. for 3 to 60 seconds.

With the above-described manufacturing method, the steel sheet according to the embodiment can be obtained.

EXAMPLES

Next, examples of the present invention will be described. However, conditions of the examples are merely exemplary to confirm the operability and the effects of the present invention, and the present invention is not limited to these condition examples. The present invention can adopt various conditions within a range not departing from the scope of the present invention as long as the object of the present invention can be achieved under the conditions.

Steels having chemical compositions shown in "Slab No. A to Z" of Table 1 were melted, and slabs having a thickness of 240 to 300 mm were manufactured by continuous casting. The obtained slabs were heated at a temperature shown in Tables 2A to 2C. The heated slabs were hot-rolled under conditions shown in Tables 2A to 2C and were coiled.

Next, the coils were uncoiled and a stress was applied to the hot-rolled steel sheets. At this time, while measuring the surface layer residual stress on-line using a portable X-ray residual stress analyzer at a working temperature (steel sheet temperature) shown in Tables 2A to 2C, a contact pressure of a grinding brush on the steel sheet surface was changed such that the residual stress was as shown in Tables 2A to 2C.

Next, by performing cold rolling at a rolling reduction (cumulative rolling reduction) shown in Tables 2A to 2C, steel sheets A1 to Z1 were obtained.

Next, the steel sheets were annealed under conditions shown in Tables 3A to 3F, were cooled to 500° C. to 650° C. at cooling rates shown in the tables, and were further cooled to temperatures shown in the tables. A holding process of holding the steel sheet at 200° C. to 490° C. for 30 to 600 seconds was further performed on some steel sheets. After cooling or holding, the steel sheets were air-cooled to room temperature. Next, some steel sheets were plated in various ways to form a plating layer on the surface. In the tables, CR represents that no plating was performed, GI represents that hot-dip galvanizing was performed, GA represents that hot-dip galvannealing was performed, EG represents that electroplating was performed, EGA represents that electrogalvannealing was performed, and Zn—Al—Mg or the like represents that plating including these elements was performed.

Regarding each of the product sheets No. A1a to Z1a, the observation of the metallographic structures in the surface layer region and the internal region and the measurement of $X_{ODF\{001\}/\{111\}}$ were performed.

In addition, in a range of 0 to 50 μm from the surface in the sheet thickness direction, the average number density and the minimum number density of the secondary phase per observed viewing field having a length of 100 μm in the sheet width direction and a length of 50 μm in the sheet thickness direction were obtained.

The volume fraction of the secondary phase in the surface layer region was obtained using the following method.

A sample (20 mm in the rolling direction×20 mm in the width direction×the thickness of the steel sheet) for metallographic structure (microstructure) observation was collected from a W/4 position of a sheet width W of the obtained steel sheet, and a metallographic structure in a range from the surface layer to the ¼ thickness position was observed using an optical microscope to calculate the area fraction of the secondary phase in a range from the surface of the steel sheet (in a case where a plating layer was present, the surface excluding the plating layer) to 20 μm. In order to prepare the sample, a sheet thickness cross section in an orthogonal-to-rolling direction was polished as an observation section and was etched with the LePera reagent.

"Microstructures" were classified based on an optical microscope image at a magnification by 500-times obtained after etching with the LePera reagent. A region ranging from the surface layer to a ¼ thickness position in the steel sheet etched with the LePera reagent was observed in 10 viewing fields at a magnification by 500-times, a region from the surface layer to a position of 20 μm of the steel sheet in the structure image is designated, and the image was processed using image analysis software "Photoshop CS5" (manufactured by Adobe Inc.) to obtain the area fraction of the secondary phase. By performing the image analysis as described above in 10 viewing fields in total, the area fraction of the secondary phase was measured. Further, the average of the area fraction values was calculated as the volume fraction of the secondary phase in the surface layer region.

In addition, the average grain size of the secondary phase in the surface layer region was obtained using the following method.

Using the same method as the method for obtaining the volume fraction of the secondary phase, a region ranging from the surface layer to a ¼ thickness position in the steel sheet etched with the LePera reagent was observed in 10 viewing fields at a magnification by 500-times, a region from the surface layer to a position of 20 μm×200 μm of the steel sheet in the structure image was selected, and the image was processed using image analysis software "Photoshop CS5" (manufactured by Adobe Inc.) to calculate the area of the secondary phase and the number of grains of the secondary phase. By adding up the values and dividing the area of the secondary phase by the number grains of the secondary phase, the average area per grain of the secondary phase was calculated. The circle equivalent diameter was calculated based on the area and the number of grains to obtain the average grain size of the secondary phase.

The volume fraction and the average grain size of the secondary phase in the internal region was obtained by using a steel sheet etched with the LePera reagent, selecting a range from a position of more than 20 μm from the surface of the sample in the sheet thickness direction to a ¼ thickness position, and analyzing the range with the same method as that of the surface layer region.

$X_{ODF\{001\}/\{111\}}$ in ferrite of the surface layer region was obtained in the following manner using EBSD (Electron Backscattering Diffraction) method.

Regarding a sample provided for EBSD method, the steel sheet was polished by mechanical grinding, strain was removed by chemical polishing or electrolytic polishing, the sample was prepared such that the cross section in the sheet thickness direction including the range from the surface to the ¼ thickness position was a measurement surface, and the texture was measured. Regarding a sample collection position in the sheet width direction, the sample was collected at a sheet width position of W/4 (position at a distance of ¼ from an end surface of the steel sheet in the sheet width direction).

In the region of the sample ranging from the surface of the steel sheet to 20 μm in the sheet thickness direction, a crystal orientation distribution was measured by EBSD method at a pitch of 0.5 μm or less. Ferrite was extracted using an IQ (Image Quality) map that is analyzable by EBSP-OIM (registered trade name, Electron Backscatter Diffraction Pattern-Orientation Image Microscopy). The threshold of the IQ value was set such that the area fraction of ferrite that was calculated by the observation of the microstructure obtained by the LePera corrosion matched the area fraction of ferrite calculated based on the IQ value. In a cross section of Φ2=45° in a three-dimensional texture (ODF: Orientation Distribution Functions) calculated using crystal orientations of the extracted ferrite, the ratio of a maximum value of X-ray random intensity ratios of a {001} orientation group to a maximum value of X-ray random intensity ratios of a {111} orientation group (γ-fiber) was obtained as $X_{ODF\{001\}/\{111\}}$.

In addition, a texture of ferrite in the internal region was obtained by designating a range from a position of more than 20 μm from the surface of the sample in the sheet thickness direction to a ¼ thickness position by the above-described EBSD method and analyzing the range with the same method as that of the surface layer region.

The number density of the grains of the secondary phase and the unevenness in the number density in the range of 0 to 50 μm from the surface in the sheet thickness direction were obtained by using a steel sheet etched with the LePera reagent, designating 10 or more observed viewing fields of 100 μm (sheet width direction)×50 (sheet thickness direction) in a range from the surface of the sample to a position of 50 μm from the surface in the sheet thickness direction, and counting the number of grains of the secondary phase in the observed viewing fields. The results are shown in Tables 4A, 4B and 4C.

The tensile strength was obtained in a tensile test that was performed according to JIS Z 2241 using a JIS No. 5 test piece cut from the direction orthogonal to the rolling direction. The results are shown in Tables 3A to 3F.

[Evaluation of Surface Appearance Quality of Steel Sheet]

In addition, regarding each of the manufactured product sheets, the surface appearance quality of the steel sheet was evaluated.

Specifically, the surface of the manufactured steel sheet was observed by viewing inspection to evaluate the surface state. The evaluation criteria of the surface appearance quality of the steel sheet were as follows.

A: no pattern was formed (more desirably, can be used as an exterior material)

B: an acceptable small pattern was formed (can be used as an exterior material)

C: an unacceptable pattern was formed (cannot be used as an exterior material)

D: a significant pattern defect was formed (cannot be used as a component)

The results are shown in Tables 3A to 3F.

[Forming Test of Steel Sheet]

A forming test was not performed on the material for which the surface appearance quality of the steel sheet was evaluated as C or D, and the forming test was performed only on the material for which the surface appearance quality of the steel sheet was evaluated as A or B.

Regarding forming, plastic strain of 10% in the rolling width direction was applied to the steel sheet of which the surface properties was measured in a cylinder drawing forming test with the Marciniak method using a deep drawing tester, a cylindrical punch of φ50 mm, and a cylindrical die of φ54 mm.

A test piece of 100 mm in the rolling width direction×50 mm in the rolling direction was prepared from a portion deformed by forming, and an arithmetic mean height Pa of a profile curve defined by JIS B0601 (2001) was measured in the direction orthogonal to the rolling direction according to JIS B0633 (2001). The evaluation was performed in the portion deformed by forming, and the evaluation length was 30 mm.

A test piece of 100 mm in the width direction×50 mm in the rolling direction was prepared from a flat portion of the formed article, and an arithmetic mean height Pa of a profile curve defined by JIS B0601 (2001) was measured in the direction orthogonal to the rolling direction according to JIS B0633 (2001). The evaluation length was 30 mm.

The amount ΔPa of increase in roughness was calculated using Pa of the formed article and Pa of the steel sheet obtained in the above-described measurement test.

Amount ΔPa of Increase in Roughness=Pa of Formed Article−Pa of Steel Sheet

The surface properties of the steel sheet after forming were evaluated based on the ΔPa. The evaluation criteria were as follows.

A: ΔPa≤0.25 μm (more desirably, can be used as an exterior material)

B: 0.25 μm<ΔPa≤0.35 μm (can be used as an exterior material)

C: 0.35 μm<ΔPa≤0.55 μm (can be used as a component but cannot be used as an exterior material)

D: 0.55 μm<ΔPa (cannot be used as a component)

[Comprehensive Evaluation]

Regarding evaluation criteria of the surface properties, among the above-described evaluation results (the evaluation of the steel sheet and the evaluation after forming), an evaluation result having a lower score was obtained as the comprehensive evaluation. The results are shown in Tables 4A to 4C.

A: more desirably, the material can be used as an exterior material

B: the material can be used as an exterior material

C: the material cannot be used as an exterior material

D: the material cannot be used as a component

Based on Tables 1 to 4C, in the examples (examples according to the present invention) where the chemical composition, the metallographic structure in the surface layer region, the metallographic structure in the internal region, and $X_{ODF\{001\}/\{111\}}$ were in the preferable ranges, the comprehensive evaluation was A or B, and the formation of surface unevenness after working was suppressed.

On the other hand, in the examples (comparative examples) where one or more of the chemical composition, the metallographic structure in the surface layer region, the metallographic structure in the internal region, and $X_{ODF\{001\}/\{111\}}$ were outside of the ranges according to the present invention, a pattern was formed or unevenness occurred in the stage of the steel sheet or after forming such that the material was not able to be used as an exterior material.

TABLE 1

| Slab No. | Chemical Composition mass % (Remainder: Fe + Impurities) | | | | | | | | | | | |
|---|---|---|---|---|---|---|---|---|---|---|---|---|
| | C | Si | Mn | P | S | Al | N | Ti | Nb | B | Mo | Cr | Ni |
| A | 0.051 | 0.050 | 0.45 | 0.020 | 0.005 | 0.20 | 0.0030 | 0.000 | 0.000 | 0.0025 | 0.39 | 0.52 | 0.00 |
| B | 0.040 | 0.050 | 1.05 | 0.005 | 0.004 | 0.11 | 0.0022 | 0.000 | 0.000 | 0.0000 | 0.29 | 0.31 | 0.00 |
| C | 0.053 | 0.030 | 1.74 | 0.020 | 0.006 | 0.14 | 0.0025 | 0.000 | 0.000 | 0.0000 | 0.00 | 0.40 | 0.00 |
| D | 0.042 | 0.007 | 1.33 | 0.007 | 0.004 | 0.02 | 0.0030 | 0.002 | 0.000 | 0.0000 | 0.00 | 0.53 | 0.00 |
| E | 0.090 | 0.200 | 0.85 | 0.015 | 0.006 | 0.01 | 0.0100 | 0.000 | 0.000 | 0.0000 | 0.00 | 0.00 | 0.00 |
| F | 0.070 | 0.040 | 1.15 | 0.015 | 0.006 | 0.45 | 0.0030 | 0.000 | 0.000 | 0.0015 | 0.00 | 0.00 | 0.00 |
| G | 0.055 | 0.100 | 1.68 | 0.030 | 0.008 | 0.06 | 0.0026 | 0.000 | 0.000 | 0.0018 | 0.01 | 0.14 | 0.00 |
| H | 0.020 | 0.010 | 2.10 | 0.016 | 0.004 | 0.03 | 0.0035 | 0.000 | 0.000 | 0.0000 | 0.00 | 0.06 | 0.00 |
| I | 0.030 | 0.005 | 1.83 | 0.025 | 0.006 | 0.08 | 0.0020 | 0.000 | 0.000 | 0.0025 | 0.01 | 0.20 | 0.01 |
| J | 0.035 | 0.008 | 1.77 | 0.020 | 0.006 | 0.08 | 0.0020 | 0.000 | 0.000 | 0.0004 | 0.00 | 0.20 | 0.25 |
| K | 0.060 | 0.040 | 0.95 | 0.015 | 0.006 | 0.45 | 0.0030 | 0.000 | 0.000 | 0.0015 | 0.15 | 0.10 | 0.01 |
| L | 0.030 | 0.006 | 1.88 | 0.015 | 0.007 | 0.05 | 0.0020 | 0.000 | 0.000 | 0.0015 | 0.00 | 0.20 | 0.00 |
| M | 0.053 | 0.030 | 1.64 | 0.020 | 0.006 | 0.14 | 0.0025 | 0.000 | 0.000 | 0.0006 | 0.00 | 0.40 | 0.00 |
| N | 0.007 | 0.010 | 0.10 | 0.015 | 0.005 | 0.05 | 0.0035 | 0.050 | 0.001 | 0.0008 | 0.00 | 0.00 | 0.00 |
| O | 0.016 | 0.020 | 1.80 | 0.030 | 0.005 | 0.03 | 0.0015 | 0.000 | 0.000 | 0.0027 | 0.01 | 0.05 | 0.00 |
| P | 0.100 | 0.100 | 1.64 | 0.028 | 0.006 | 0.05 | 0.0016 | 0.000 | 0.000 | 0.0018 | 0.01 | 0.14 | 0.00 |
| Q | 0.095 | 0.350 | 1.60 | 0.020 | 0.005 | 0.05 | 0.0010 | 0.000 | 0.000 | 0.0022 | 0.01 | 0.15 | 0.00 |
| R | 0.037 | 0.010 | 0.19 | 0.010 | 0.005 | 0.03 | 0.0028 | 0.001 | 0.000 | 0.0001 | 0.00 | 0.00 | 0.00 |
| S | 0.020 | 0.030 | 2.20 | 0.020 | 0.006 | 0.08 | 0.0025 | 0.000 | 0.000 | 0.0019 | 0.00 | 0.10 | 0.00 |
| T | 0.037 | 0.050 | 2.00 | 0.008 | 0.005 | 0.60 | 0.0030 | 0.010 | 0.000 | 0.0000 | 0.00 | 0.50 | 0.00 |
| U | 0.055 | 0.100 | 1.68 | 0.030 | 0.008 | 0.06 | 0.0026 | 0.000 | 0.000 | 0.0051 | 0.01 | 0.10 | 0.00 |
| V | 0.020 | 0.020 | 1.40 | 0.050 | 0.004 | 0.04 | 0.0030 | 0.050 | 0.020 | 0.0007 | 0.00 | 0.10 | 0.00 |
| W | 0.060 | 0.017 | 1.21 | 0.015 | 0.003 | 0.02 | 0.0031 | 0.000 | 0.000 | 0.0000 | 0.42 | 0.00 | 0.00 |
| X | 0.085 | 0.011 | 1.33 | 0.004 | 0.002 | 0.12 | 0.0045 | 0.000 | 0.000 | 0.0000 | 0.35 | 0.80 | 0.00 |
| Z | 0.070 | 0.250 | 1.70 | 0.020 | 0.005 | 0.40 | 0.0010 | 0.000 | 0.000 | 0.0022 | 0.01 | 0.00 | 0.00 |

TABLE 2A

| Slab | Steel Sheet | Heating Process Heating Temperature °C. | Hot-Rolling Process Finish Rolling Start Temperature °C. | Hot-Rolling Process Finish Rolling Finishing Temperature °C. | Hot-Rolling Process Change in Hot-Rolling Process °C. | Coiling Process Coiling Temperature °C. | Stress Application Process Residual Stress MPa | Stress Application Process Working Temperature T °C. | Cold-Rolling Process Rolling Reduction % |
|---|---|---|---|---|---|---|---|---|---|
| A | A1 | 1200 | 950 | 890 | −60 | 700 | 248 | 112 | 78 |
| A | A2 | 1200 | 950 | 890 | −60 | 750 | 325 | 40 | 85 |
| A | A3 | 1200 | 950 | 890 | −60 | 750 | 248 | 112 | 92 |
| A | A4 | 1200 | 940 | 880 | −60 | 660 | 26 | 165 | 80 |
| A | A5 | 1220 | 1010 | 930 | −60 | 620 | 12 | 140 | 80 |
| B | B1 | 1200 | 930 | 880 | −50 | 600 | 104 | 30 | 77 |
| B | B2 | 1100 | 850 | 880 | 30 | 550 | 177 | 242 | 85 |
| B | B3 | 1200 | 810 | 850 | 40 | 680 | 265 | 43 | 85 |
| B | B4 | 1200 | 930 | 880 | −50 | 600 | 180 | 30 | 80 |
| C | C1 | 1200 | 910 | 890 | −20 | 600 | 205 | 30 | 85 |
| C | C2 | 1200 | 845 | 870 | 35 | 580 | 337 | 103 | 80 |
| C | C3 | 1050 | 800 | 850 | 50 | 600 | 424 | 40 | 90 |
| C | C4 | 1050 | 800 | 850 | 50 | 600 | 223 | 30 | 72 |
| C | C5 | 1050 | 800 | 850 | 50 | 600 | 10 | *2 | 72 |
| C | C6 | 1230 | 1020 | 920 | −100 | 640 | 32 | 120 | 85 |
| D | D1 | 1100 | 850 | 885 | 35 | 530 | 153 | 30 | 90 |
| D | D2 | 1100 | 850 | 885 | 35 | 480 | 349 | 30 | 87 |
| D | D3 | 1100 | 850 | 885 | 35 | 480 | 349 | 30 | 92 |
| E | E1 | 1300 | 1080 | 950 | −130 | 600 | 238 | 120 | 85 |
| E | E2 | 1280 | 1050 | 930 | −120 | 550 | 181 | 50 | 85 |

*2 represents that stress application was not performed.

TABLE 2B

| Slab | Steel Sheet | Heating Process Heating Temperature °C. | Hot-Rolling Process Finish Rolling Start Temperature °C. | Hot-Rolling Process Finish Rolling Finishing Temperature °C. | Hot-Rolling Process Change in Hot-Rolling Process °C. | Coiling Process Coiling Temperature °C. | Stress Application Process Residual Stress MPa | Stress Application Process Working Temperature T °C. | Cold-Rolling Process Rolling Reduction % |
|---|---|---|---|---|---|---|---|---|---|
| E | E3 | 1100 | 860 | 887 | 27 | 640 | 210 | 40 | 87 |
| E | E4 | 1100 | 860 | 887 | 27 | 640 | 151 | 40 | 90 |
| F | F1 | 1200 | 950 | 900 | −50 | 680 | 204 | 27 | 80 |
| F | F2 | 1200 | 950 | 900 | −50 | 680 | 426 | 25 | 73 |
| G | G1 | 1100 | 850 | 885 | 35 | 700 | 231 | 30 | 85 |
| G | G2 | 1100 | 850 | 885 | 35 | 700 | 80 | 510 | 87 |
| G | G3 | 1100 | 850 | 885 | 35 | 700 | 87 | 510 | 68 |
| H | H1 | 1200 | 930 | 890 | −40 | 560 | 161 | 45 | 85 |
| H | H2 | 1200 | 930 | 890 | −40 | 560 | 164 | 45 | 65 |
| H | H3 | 1300 | 1090 | 960 | −130 | 700 | 161 | 45 | 85 |
| I | I1 | 1200 | 850 | 890 | 40 | 680 | 197 | 30 | 82 |
| I | I2 | 1200 | 850 | 890 | 40 | 680 | 10 | *2 | 82 |
| J | J1 | 1200 | 910 | 890 | −20 | 700 | 302 | 35 | 83 |
| J | J2 | 1100 | 850 | 870 | 20 | 650 | 250 | 30 | 72 |
| J | J3 | 1010 | 790 | 860 | 70 | 550 | 287 | 27 | 83 |
| J | J4 | 1200 | 910 | 890 | −20 | 760 | 260 | 50 | 83 |
| K | K1 | 1200 | 920 | 890 | −30 | 600 | 301 | 20 | 88 |
| K | K2 | 1200 | 930 | 870 | −60 | 650 | 275 | 35 | 87 |
| K | K3 | 1200 | 820 | 845 | 25 | 700 | 375 | 20 | 85 |
| K | K4 | 1200 | 820 | 845 | 25 | 700 | 245 | 25 | 82 |

*2 represents that stress application was not performed.

TABLE 2C

| Slab | Steel Sheet | Heating Process Heating Temperature °C. | Hot-Rolling Process Finish Rolling Start Temperature °C. | Hot-Rolling Process Finish Rolling Finishing Temperature °C. | Hot-Rolling Process Change in Hot-Rolling Process °C. | Coiling Process Coiling Temperature °C. | Stress Application Process Residual Stress MPa | Stress Application Process Working Temperature T °C. | Cold-Rolling Process Rolling Reduction % |
|---|---|---|---|---|---|---|---|---|---|
| L | L1 | 1250 | 850 | 880 | 30 | 580 | 355 | 50 | 85 |
| L | L2 | 1250 | 850 | 880 | 30 | 580 | 313 | 25 | 82 |
| M | M1 | 1200 | 925 | 895 | −30 | 520 | 250 | 110 | 87 |

TABLE 2C-continued

| | | Heating Process | Hot-Rolling Process | | | Coiling Process | Stress Application Process | | Cold-Rolling Process |
|---|---|---|---|---|---|---|---|---|---|
| Slab | Steel Sheet | Heating Temperature ° C. | Finish Rolling Start Temperature ° C. | Finish Rolling Finishing Temperature ° C. | Temperature Change in Hot-Rolling Process ° C. | Coiling Temperature ° C. | Residual Stress MPa | Working Temperature T ° C. | Rolling Reduction % |
| M | M2 | 1200 | 925 | 895 | −30 | 520 | 200 | 110 | 92 |
| N | N1 | 1250 | 960 | 910 | −50 | 760 | 466 | 30 | 87 |
| O | O1 | 1200 | 925 | 870 | −55 | 480 | 329 | 45 | 72 |
| P | P1 | 1100 | 860 | 865 | 5 | 670 | 10 | *2 | 80 |
| P | P2 | 1200 | 950 | 890 | −60 | 700 | 335 | 40 | 80 |
| Q | Q1 | 1200 | 950 | 905 | −45 | 650 | 198 | 40 | 72 |
| R | R1 | 1200 | 920 | 890 | −30 | 550 | 10 | *2 | 80 |
| S | S1 | 1200 | 930 | 880 | −50 | 500 | 215 | 55 | 80 |
| S | S2 | 1200 | 930 | 880 | −50 | 500 | 185 | 300 | 92 |
| T | T1 | 1100 | 835 | 870 | 35 | 600 | 211 | 30 | 77 |
| U | U1 | 1050 | 800 | 850 | 50 | 650 | 220 | 208 | 77 |
| U | U2 | 1050 | 800 | 850 | 50 | 650 | 220 | 208 | 68 |
| V | V1 | 1200 | 910 | 880 | −30 | 700 | 221 | 50 | 70 |
| W | W1 | 1250 | 950 | 905 | −45 | 550 | 311 | 30 | 65 |
| W | W2 | 1250 | 950 | 905 | −45 | 550 | 161 | 45 | 85 |
| X | X1 | 1200 | 920 | 880 | −40 | 650 | 150 | 40 | 85 |
| Z | Z1 | 1100 | 860 | 887 | 27 | 640 | 210 | 40 | 87 |

*2 represents that stress application was not performed.

TABLE 3A

| | | Annealing Process | | | | | Cooling Process | | | | | | |
|---|---|---|---|---|---|---|---|---|---|---|---|---|---|
| Steel Sheet | Product Sheet No. | Average Heating Rate ° C./s | Lower Limit of Expression (1) | Upper Limit of Expression (1) | Annealing Temperature ° C. | Annealing Time sec | Cooling Rate in T1 to 650° C. ° C./s | Cooling Stop Temperature ° C. | Cooling Rate in 200° C. to 490° C. ° C./s | Cooling Stop Temperature ° C. | Holding Step | Surface Treatment Type of Plating | Sheet Thickness mm |
| A1 | A1a | 3.7 | 775 | 814 | 790 | 90.0 | 4.3 | 560 | 10 | 450 | Not Provided | GA | 0.50 |
| A1 | A1b | 3.7 | 775 | 814 | 790 | 90.0 | 4.3 | 570 | 10 | 450 | Not Provided | Lubricant GA | 0.50 |
| A2 | A2a | 2.0 | 736 | 779 | 770 | 140.0 | 2.9 | 560 | 7 | 420 | Not Provided | GI | 0.35 |
| A2 | A2b | 2.0 | 736 | 779 | 770 | 140.0 | 2.9 | 560 | 7 | 450 | Not Provided | Al—Si | 0.35 |
| A2 | A2c | 2.0 | 736 | 779 | 770 | 140.0 | 2.9 | 580 | 7 | 450 | Not Provided | Zn—Al | 0.35 |
| A3 | A3a | 4.2 | 712 | 758 | 770 | 80.0 | 4.8 | 560 | 14 | 400 | Not Provided | GA | 0.25 |
| A4 | A4a | 3.6 | 827 | 867 | 850 | 66.0 | 2.6 | 570 | 6 | 460 | Not Provided | GA | 0.40 |
| A5 | A5a | 3.9 | 848 | 888 | 860 | 130.0 | 3.4 | 590 | 8 | 470 | Not Provided | GA | 0.40 |
| B1 | B1a | 3.2 | 803 | 842 | 840 | 110.0 | 3.6 | 560 | 9 | 400 | Not Provided | GA | 0.75 |
| B2 | B2a | 2.5 | 753 | 795 | 760 | 130.0 | 2.9 | 580 | 7 | 490 | Not Provided | GA | 0.40 |
| B3 | B3a | 5.8 | 742 | 784 | 750 | 60.0 | 6.2 | 590 | 16 | 470 | Not Provided | GA | 0.45 |
| B4 | B4a | 2.7 | 775 | 815 | 800 | 120.0 | 3.1 | 620 | 8 | 460 | Not Provided | GA | 0.45 |
| B4 | B4b | 2.7 | 775 | 815 | 800 | 120.0 | 3.1 | 560 | 8 | 450 | Not Provided | Zn—Al—Mg | 0.45 |
| C1 | C1a | 5.8 | 749 | 791 | 780 | 60.0 | 6.2 | 600 | 16 | 400 | Not Provided | GA | 0.35 |
| C2 | C2a | 3.7 | 758 | 798 | 780 | 90.0 | 4.3 | 580 | 10 | 400 | Provided | GA | 0.65 |
| C3 | C3a | 2.7 | 707 | 752 | 750 | 120.0 | 3.1 | 560 | 8 | 350 | Not Provided | GI | 0.22 |
| C4 | C4a | 5.8 | 805 | 841 | 820 | 60.0 | 6.2 | 550 | 16 | 350 | Provided | GI | 0.55 |
| C5 | C5a | 9.5 | 889 | 925 | 860 | 30.0 | 9.9 | 570 | 80 | 400 | Not Provided | GA | 0.55 |
| C6 | C6a | 3.2 | 799 | 841 | 820 | 70.0 | 2.6 | 580 | 6 | 450 | Not Provided | GA | 0.40 |
| D1 | D1a | 5.8 | 734 | 779 | 770 | 60.0 | 6.2 | 560 | 40 | 400 | Not Provided | GA | 0.30 |
| D2 | D2a | 3.3 | 725 | 769 | 765 | 100.0 | 3.8 | 590 | 15 | 400 | Provided | GA | 0.40 |
| D3 | D3a | 2.7 | 703 | 749 | 745 | 60.0 | 3.1 | 600 | 8 | 350 | Not Provided | GI | 0.25 |
| E1 | E1a | 3.7 | 745 | 787 | 780 | 90.0 | 4.3 | 550 | 10 | 350 | Provided | GI | 0.45 |

TABLE 3B

| | | Annealing Process | | | | | Cooling Process | | | | | | |
|---|---|---|---|---|---|---|---|---|---|---|---|---|---|
| Steel Sheet | Product Sheet No. | Average Heating Rate ° C./s | Lower Limit of Expression (1) | Upper Limit of Expression (1) | Annealing Temperature ° C. | Annealing Time sec | Cooling Rate in T1 to 650° C. ° C./s | Cooling Stop Temperature ° C. | Cooling Rate in 200° C. to 490° C. ° C./s | Cooling Stop Temperature ° C. | Holding Step | Surface Treatment Type of Plating | Sheet Thickness mm |
| E2 | E2a | 2.7 | 752 | 795 | 780 | 120.0 | 3.1 | 610 | 8 | 450 | Not Provided | GA | 0.45 |

TABLE 3B-continued

| | | Annealing Process | | | | | Cooling Process | | | | | | |
|---|---|---|---|---|---|---|---|---|---|---|---|---|---|
| Steel Sheet | Product Sheet No. | Average Heating Rate ° C./s | Lower Limit of Expression (1) | Upper Limit of Expression (1) | Annealing Temperature ° C. | Annealing Time sec | Cooling Rate in T1 to 650° C. ° C./s | Cooling Stop Temperature ° C. | Cooling Rate in 200° C. to 490° C. ° C./s | Cooling Stop Temperature ° C. | Holding Step | Surface Treatment Type of Plating | Sheet Thickness mm |
| E3 | E3a | 2.7 | 739 | 783 | 780 | 120.0 | 3.1 | 590 | 8 | 450 | Not Provided | GA | 0.40 |
| E3 | E3b | 2.7 | 739 | 783 | 780 | 120.0 | 3.1 | 560 | 8 | 400 | Provided | Zn—Al—Mg—Si | 0.40 |
| E4 | E4a | 5.4 | 739 | 783 | 780 | 60.0 | 6.2 | 580 | 40 | 200 | Provided | Sn | 0.15 |
| F1 | F1a | 6.6 | 771 | 811 | 800 | 50.0 | 7.6 | 560 | 100 | 200 | Provided | CR | 0.60 |
| F1 | F1b | 6.6 | 771 | 811 | 800 | 50.0 | 7.6 | 570 | 100 | 250 | Provided | Phosphate Coating EG | 0.60 |
| F2 | F2a | 8.3 | 783 | 820 | 820 | 40.0 | 9.2 | 580 | 150 | 250 | Provided | CR | 0.80 |
| G1 | G1a | 3.8 | 746 | 788 | 780 | 70.0 | 6.7 | 560 | 80 | 250 | Provided | EG | 0.50 |
| G2 | G2a | 5.4 | 765 | 809 | 770 | 50.0 | 9.5 | 570 | 70 | 250 | Provided | EG | 0.40 |
| G3 | G3a | 2.5 | 848 | 882 | 850 | 110.0 | 4.3 | 580 | 20 | 250 | Provided | CR | 0.95 |
| H1 | H1a | 1.7 | 755 | 798 | 790 | 150.0 | 3.0 | 580 | 10 | 300 | Provided | CR | 0.50 |
| H1 | H1b | 1.7 | 755 | 798 | 750 | 150.0 | 3.0 | 560 | 10 | 300 | Provided | CR | 0.50 |
| H2 | H2a | 3.4 | 845 | 877 | 820 | 80.0 | 6.0 | 570 | 20 | 300 | Provided | CR | 1.00 |
| H3 | H3a | 1.7 | 755 | 798 | 790 | 150.0 | 3.0 | 580 | 10 | 300 | Provided | CR | 1.00 |
| I1 | I1a | 6.6 | 763 | 804 | 780 | 50.0 | 7.6 | 590 | 100 | 300 | Provided | CR | 0.40 |
| I2 | I2a | 2.2 | 844 | 885 | 820 | 120.0 | 3.9 | 600 | 50 | 300 | Provided | CR | 0.40 |
| J1 | J1a | 2.9 | 747 | 789 | 780 | 90.0 | 5.2 | 560 | 24 | 400 | Provided | CR | 0.55 |
| J2 | J2a | 2.5 | 802 | 838 | 835 | 110.0 | 4.3 | 600 | 20 | 200 | Not Provided | CR | 0.85 |
| J3 | J3a | 3.4 | 749 | 790 | 780 | 80.0 | 6.0 | 580 | 30 | 400 | Provided | EG | 0.55 |
| J4 | J4a | 2.2 | 751 | 793 | 780 | 120.0 | 3.9 | 570 | 18 | 200 | Not Provided | EG | 0.55 |
| K1 | K1a | 2.2 | 725 | 769 | 760 | 120.0 | 3.9 | 570 | 18 | 200 | Not Provided | EG | 0.35 |
| K2 | K2a | 2.2 | 732 | 775 | 760 | 120.0 | 3.9 | 580 | 18 | 350 | Provided | CR | 0.40 |
| K3 | K3a | 4.4 | 732 | 775 | 800 | 60.0 | 7.7 | 560 | 35 | 350 | Provided | CR | 0.35 |

TABLE 3C

| | | Annealing Process | | | | | Cooling Process | | | | | | |
|---|---|---|---|---|---|---|---|---|---|---|---|---|---|
| Steel Sheet | Product Sheet No. | Average Heating Rate ° C./s | Lower Limit of Expression (1) | Upper Limit of Expression (1) | Annealing Temperature ° C. | Annealing Time sec | Cooling Rate in T1 to 650° C. ° C./s | Cooling Stop Temperature ° C. | Cooling Rate in 200° C. to 490° C. ° C./s | Cooling Stop Temperature ° C. | Holding Step | Surface Treatment Type of Plating | Sheet Thickness mm |
| K4 | K4a | 2.9 | 757 | 798 | 780 | 90.0 | 5.2 | 570 | 25 | 350 | Provided | EG | 0.40 |
| L1 | L1a | 3.7 | 734 | 776 | 780 | 90.0 | 4.3 | 560 | 20 | 250 | Not Provided | GA | 0.35 |
| L2 | L2a | 9.3 | 751 | 792 | 780 | 150.0 | 9.9 | 580 | 500 | 200 | Not Provided | EGA | 0.55 |
| L2 | L2b | 2.0 | 751 | 792 | 780 | 150.0 | 1.1 | 600 | 50 | 460 | Not Provided | GA | 0.55 |
| L2 | L2c | 11.5 | 751 | 792 | 780 | 30.0 | 9.9 | 560 | 500 | 460 | Not Provided | GA | 0.55 |
| M1 | M1a | 3.7 | 734 | 778 | 770 | 90.0 | 4.3 | 550 | 20 | 460 | Not Provided | GA | 0.40 |
| M2 | M2a | 3.7 | 718 | 764 | 770 | 90.0 | 4.3 | 580 | 20 | 450 | Not Provided | GA | 0.20 |
| N1 | N1a | 4.4 | 718 | 761 | 750 | 60.0 | 7.7 | 590 | 35 | 400 | Provided | CR | 0.30 |
| O1 | O1a | 4.2 | 795 | 831 | 810 | 80.0 | 4.8 | 560 | 20 | 430 | Not Provided | GA | 0.65 |
| P1 | P1a | 5.4 | 853 | 893 | 800 | 60.0 | 6.2 | 600 | 32 | 430 | Not Provided | GA | 0.60 |
| P2 | P2a | 3.8 | 758 | 798 | 790 | 100.0 | 5.4 | 570 | 25 | 450 | Not Provided | GA | 0.60 |
| Q1 | Q1a | 2.7 | 808 | 844 | 840 | 120.0 | 3.1 | 560 | 16 | 450 | Not Provided | GA | 0.85 |
| R1 | R1a | 2.7 | 853 | 893 | 860 | 120.0 | 3.1 | 550 | 16 | 400 | Not Provided | GI | 0.55 |
| S1 | S1a | 3.7 | 770 | 810 | 800 | 90.0 | 4.4 | 560 | 19 | 350 | Provided | CR | 0.60 |
| S2 | S2a | 3.7 | 720 | 766 | 780 | 90.0 | 4.3 | 580 | 18 | 445 | Not Provided | GA | 0.20 |
| T1 | T1a | 3.8 | 784 | 822 | 790 | 100.0 | 5.4 | 590 | 25 | 445 | Not Provided | GA | 0.75 |
| U1 | U1a | 5.4 | 783 | 821 | 800 | 60.0 | 6.2 | 600 | 30 | 420 | Not Provided | GI | 0.60 |
| U2 | U2a | 4.7 | 823 | 857 | 800 | 60.0 | 7.7 | 610 | 35 | 300 | Provided | CR | 0.70 |
| V1 | V1a | 2.9 | 814 | 849 | 810 | 90.0 | 5.2 | 560 | 25 | 450 | Not Provided | GA | 0.95 |
| W1 | W1a | 2.9 | 828 | 860 | 850 | 90.0 | 5.2 | 570 | 25 | 300 | Provided | CR | 1.10 |
| W2 | W2a | 2.9 | 755 | 798 | 790 | 120.0 | 3.1 | 590 | 15 | 300 | Provided | CR | 0.45 |
| X1 | X1a | 2.7 | 757 | 800 | 790 | 150.0 | 3.1 | 600 | 8 | 450 | Not Provided | GA | 0.35 |
| Z1 | Z1a | 2.2 | 739 | 783 | 760 | 120.0 | 3.9 | 610 | 15 | 450 | Not Provided | GA | 0.40 |

TABLE 3D

| Product Sheet No. | Surface Layer Region | | | Internal Region | | | ΔXODF {001}/{111} Surface Layer Region-Internal Region | Surface Evaluation (Steel Sheet) | Tensile Strength MPa | Note |
|---|---|---|---|---|---|---|---|---|---|---|
| | Fraction of Secondary Phase % | Average Grain Size of Secondary Phase μm | XODF {001}/{111} of Ferrite | Fraction of Secondary Phase % | Average Grain Size of Secondary Phase μm | XODF {001}/{111} of Ferrite | | | | |
| A1a | 1.5 | 1.1 | 1.90 | 4.9 | 1.5 | 1.50 | 0.40 | A | 431 | Example |
| A1b | 1.5 | 1.1 | 1.90 | 4.9 | 1.5 | 1.50 | 0.40 | A | 461 | Example |
| A2a | 1.7 | 3.2 | 1.70 | 4.4 | 3.5 | 1.40 | 0.30 | A | 455 | Example |
| A2b | 1.3 | 2.9 | 1.70 | 4.0 | 3.3 | 1.40 | 0.30 | B | 450 | Example |
| A2c | 1.4 | 3.0 | 1.70 | 4.1 | 3.5 | 1.40 | 0.30 | B | 451 | Example |
| A3a | 1.9 | 2.1 | 2.50 | 4.1 | 3.5 | 0.30 | 2.20 | B | 452 | Comparative Example |
| A4a | 6.6 | 2.6 | 1.70 | 1.8 | 2.3 | 1.60 | 0.10 | B | 426 | Comparative Example |
| A5a | 1.6 | 2.9 | 1.82 | 5.1 | 4.3 | 1.78 | 0.04 | C | 457 | Comparative Example |
| B1a | 0.9 | 3.5 | 0.51 | 4.8 | 2.8 | 0.48 | 0.03 | B | 459 | Comparative Example |
| B2a | 2.8 | 1.5 | 1.40 | 5.8 | 1.8 | 1.10 | 0.30 | A | 473 | Example |
| B3a | 2.1 | 1.1 | 0.80 | 6.4 | 1.9 | 0.66 | 0.14 | A | 479 | Example |
| B4a | 1.3 | 2.1 | 0.65 | 3.8 | 2.4 | 0.45 | 0.20 | A | 447 | Example |
| B4b | 1.1 | 2.0 | 0.65 | 3.4 | 2.5 | 0.45 | 0.20 | A | 442 | Example |
| C1a | 4.8 | 1.1 | 0.68 | 7.1 | 1.8 | 0.54 | 0.14 | A | 491 | Example |
| C2a | 4.5 | 0.8 | 0.73 | 8.0 | 1.4 | 0.51 | 0.22 | A | 502 | Example |
| C3a | 4.4 | 2.2 | 3.20 | 8.5 | 1.3 | 0.50 | 2.70 | A | 508 | Comparative Example |
| C4a | 4.9 | 2.6 | 0.85 | 7.4 | 2.8 | 0.71 | 0.14 | A | 495 | Example |
| C5a | 5.1 | 0.4 | 0.33 | 9.4 | 3.9 | 0.25 | 0.08 | A | 519 | Comparative Example |
| C6a | 1.9 | 2.2 | 1.50 | 1.9 | 2.4 | 1.50 | 0.00 | A | 412 | Comparative Example |
| D1a | 4.3 | 3.3 | 1.80 | 9.7 | 3.5 | 1.50 | 0.30 | A | 522 | Example |
| D2a | 4.7 | 2.5 | 1.60 | 8.8 | 3.0 | 1.38 | 0.22 | A | 512 | Example |
| D3a | 4.2 | 2.3 | 3.07 | 8.6 | 2.5 | 0.85 | 2.22 | A | 509 | Comparative Example |
| E1a | 0.3 | 0.08 | 0.83 | 3.4 | 1.1 | 0.75 | 0.08 | A | 441 | Example |

TABLE 3E

| Product Sheet No. | Surface Layer Region | | | Internal Region | | | ΔXODF {001}/{111} Surface Layer Region-Internal Region | Surface Evaluation (Steel Sheet) | Tensile Strength MPa | Note |
|---|---|---|---|---|---|---|---|---|---|---|
| | Fraction of Secondary Phase % | Average Grain Size of Secondary Phase μm | XODF {001}/{111} of Ferrite | Fraction of Secondary Phase % | Average Grain Size of Secondary Phase μm | XODF {001}/{111} of Ferrite | | | | |
| E2a | 0.2 | 0.05 | 0.81 | 3.0 | 1.2 | 0.68 | 0.13 | A | 436 | Example |
| E3a | 0.4 | 0.24 | 0.94 | 3.2 | 1.6 | 0.72 | 0.22 | B | 439 | Example |
| E3b | 0.4 | 0.35 | 0.94 | 3.0 | 1.7 | 0.72 | 0.22 | A | 436 | Example |
| E4a | 0.6 | 0.32 | 1.18 | 3.6 | 1.4 | 1.03 | 0.22 | A | 444 | Example |
| F1a | 4.1 | 2.5 | 1.02 | 8.5 | 2.7 | 0.57 | 0.45 | A | 507 | Example |
| F1b | 4.1 | 2.5 | 1.02 | 8.5 | 2.7 | 0.57 | 0.45 | A | 507 | Example |
| F2a | 4.8 | 4.5 | 0.55 | 10.6 | 4.5 | 0.32 | 0.23 | A | 533 | Comparative Example |
| G1a | 3.9 | 1.5 | 1.40 | 6.9 | 2.4 | 1.00 | 0.40 | B | 488 | Example |
| G2a | 3.8 | 1.2 | 0.55 | 5.8 | 1.8 | 0.45 | 0.10 | B | 474 | Comparative Example |
| G3a | 2.7 | 2.4 | 0.48 | 4.3 | 3.0 | 0.88 | −0.40 | B | 455 | Comparative Example |
| H1a | 1.5 | 1.6 | 0.65 | 4.1 | 2.0 | 0.59 | 0.06 | A | 451 | Example |
| H1b | 1.1 | 1.2 | 0.49 | 3.6 | 1.5 | 0.67 | −0.18 | A | 445 | Comparative Example |
| H2a | 0.5 | 1.9 | 0.20 | 2.5 | 2.3 | 0.30 | −0.10 | A | 431 | Comparative Example |
| H3a | 1.9 | 3.1 | 0.41 | 3.8 | 3.4 | 0.37 | 0.04 | A | 448 | Comparative Example |
| I1a | 2.4 | 1.5 | 0.88 | 6.3 | 2.4 | 0.64 | 0.24 | B | 479 | Example |
| I2a | 2.6 | 1.8 | 0.24 | 5.9 | 2.9 | 0.22 | 0.02 | B | 474 | Comparative Example |
| J1a | 0.5 | 1.4 | 1.00 | 4.9 | 1.1 | 0.77 | 0.23 | B | 459 | Example |
| J2a | 0.3 | 0.7 | 1.10 | 4.8 | 1.1 | 0.73 | 0.37 | A | 458 | Example |
| J3a | 0.6 | 1.0 | 0.96 | 5.1 | 1.1 | 0.57 | 0.39 | A | 462 | Example |

TABLE 3E-continued

| | Surface Layer Region | | | Internal Region | | | ΔXODF | | | |
|---|---|---|---|---|---|---|---|---|---|---|
| Product Sheet No. | Fraction of Secondary Phase % | Average Grain Size of Secondary Phase μm | XODF {001}/ {111} of Ferrite | Fraction of Secondary Phase % | Average Grain Size of Secondary Phase μm | XODF {001}/ {111} of Ferrite | {001}/{111} Surface Layer Region- Internal Region | Surface Evaluation (Steel Sheet) | Tensile Strength MPa | Note |
| J4a | 0.5 | 1.6 | 0.81 | 5.2 | 1.2 | 0.57 | 0.24 | B | 463 | Example |
| K1a | 2.4 | 1.5 | 1.95 | 7.5 | 2.6 | 1.44 | 0.51 | A | 493 | Example |
| K2a | 1.6 | 1.6 | 0.68 | 7.9 | 2.3 | 0.46 | 0.22 | A | 497 | Example |
| K3a | 1.9 | 2.0 | 4.60 | 7.6 | 2.2 | 3.10 | 1.50 | A | 493 | Comparative Example |

TABLE 3F

| | Surface Layer Region | | | Internal Region | | | ΔXODF | | | |
|---|---|---|---|---|---|---|---|---|---|---|
| Product Sheet No. | Fraction of Secondary Phase % | Average Grain Size of Secondary Phase μm | XODF {001}/ {111} of Ferrite | Fraction of Secondary Phase % | Average Grain Size of Secondary Phase μm | XODF {001}/ {111} of Ferrite | {001}/{111} Surface Layer Region- Internal Region | Surface Evaluation (Steel Sheet) | Pensile Strength MPa | Note |
| K4a | 1.7 | 1.1 | 1.13 | 7.1 | 1.6 | 1.28 | −0.15 | A | 487 | Example |
| L1a | 4.5 | 2.1 | 2.50 | 6.8 | 2.2 | 2.54 | −0.04 | B | 487 | Comparative Example |
| L2a | 3.7 | 1.9 | 1.70 | 6.9 | 2.1 | 1.48 | 0.22 | B | 488 | Example |
| L2b | 1.4 | 2.2 | 1.65 | 5.7 | 1.7 | 1.64 | 0.01 | A | 470 | Example |
| L2c | 5.1 | 1.1 | 0.55 | 5.2 | 1.4 | 0.58 | −0.03 | A | 469 | Comparative Example |
| M1a | 2.8 | 0.99 | 0.62 | 4.0 | 1.5 | 0.41 | 0.21 | A | 452 | Example |
| M2a | 2.4 | 1.1 | 0.25 | 4.1 | 1.2 | 0.28 | −0.03 | A | 452 | Comparative Example |
| N1a | 0.005 | 0.1 | 0.30 | 0.2 | 0.2 | 0.07 | 0.23 | A | 352 | Comparative Example |
| O1a | 2.6 | 1.6 | 0.55 | 3.7 | 2.1 | 0.24 | 0.31 | A | 448 | Comparative Example |
| P1a | 5.5 | 0.7 | 0.31 | 11.6 | 2.9 | 0.30 | 0.01 | B | 546 | Comparative Example |
| P2a | 5.2 | 1.9 | 1.87 | 10.9 | 2.8 | 1.19 | 0.68 | B | 537 | Comparative Example |
| Q1a | 12.1 | 3.1 | 0.48 | 9.7 | 2.1 | 0.56 | −0.08 | C | 532 | Comparative Example |
| R1a | 0 | — | 0.45 | 0.3 | 0.1 | 0.18 | 0.27 | A | 314 | Comparative Example |
| S1a | 12.7 | 4.1 | 3.60 | 13.6 | 5.1 | 3.80 | −0.20 | B | 580 | Comparative Example |
| S2a | 10.2 | 3.7 | 6.10 | 11.6 | 3.7 | 4.50 | 1.60 | D | 552 | Comparative Example |
| T1a | 11.9 | 2.0 | 1.50 | 18.9 | 4.6 | 1.80 | −0.30 | C | 642 | Comparative Example |
| U1a | 5.1 | 2.2 | 2.35 | 5.3 | 1.8 | 0.84 | 1.51 | C | 470 | Comparative Example |
| U2a | 5.3 | 1.1 | 2.23 | 6.4 | 1.7 | 0.62 | 1.61 | C | 484 | Comparative Example |
| V1a | 1.2 | 0.7 | 0.11 | 1.1 | 0.9 | 0.17 | −0.06 | C | 415 | Comparative Example |
| W1a | 8.9 | 3.6 | 6.50 | 11.1 | 3.1 | 4.80 | 1.70 | A | 545 | Comparative Example |
| W2a | 8.4 | 1.8 | 0.65 | 10.5 | 1.5 | 0.30 | 0.49 | A | 537 | Comparative Example |
| X1a | 23.2 | 4.5 | 0.70 | 28.4 | 4.2 | 1.29 | −0.59 | A | 771 | Comparative Example |
| Z1a | 16.5 | 4.2 | 0.62 | 21.0 | 5.1 | 0.19 | 0.43 | B | 673 | Comparative Example |

TABLE 4A

| Product Sheet No. | Test Piece No. | Surface to 50 μm Average Number Density of Secondary Phase | Surface to 50 μm Difference from Minimum Number Density of Secondary Phase | Forming Test Plastic Strain ε1 | Forming Test Amount ΔPa of Increase in Roughness [μm] | Surface Shape after Forming | Comprehensive Evaluation | Note |
| --- | --- | --- | --- | --- | --- | --- | --- | --- |
| A1a | A1a-1 | 52 | 10 | 10% | 0.27 | B | B | Example |
| A1b | A1b-1 | 52 | 10 | 10% | 0.27 | B | B | Example |
| A2a | A2a-1 | 30 | 9 | 10% | 0.20 | A | A | Example |
| A2b | A2b-1 | 41 | 9 | 10% | 0.16 | A | B | Example |
| A2c | A2c-1 | 54 | 9 | 10% | 0.17 | A | B | Example |
| A3a | A3a-1 | 38 | 8 | 10% | 0.43 | C | C | Comparative Example |
| A4a | A4a-1 | 46 | 10 | 10% | 0.49 | C | C | Comparative Example |
| A5a | A5a-1 | 43 | 9 | 10% | 0.41 | C | C | Comparative Example |
| B1a | B1a-1 | 22 | 7 | 10% | 0.43 | C | C | Comparative Example |
| B2a | B2a-1 | 70 | 9 | 10% | 0.16 | A | A | Example |
| B3a | B3a-1 | 133 | 19 | 10% | 0.27 | B | B | Example |
| B4a | B4a-1 | 78 | 15 | 10% | 0.28 | B | B | Example |
| B4b | B4b-1 | 68 | 13 | 10% | 0.25 | A | A | Example |
| C1a | C1a-1 | 86 | 14 | 10% | 0.27 | B | B | Example |
| C2a | C2a-1 | 130 | 20 | 10% | 0.26 | B | B | Example |
| C3a | C3a-1 | 70 | 14 | 10% | 0.48 | C | C | Comparative Example |
| C4a | C4a-1 | 44 | 7 | 10% | 0.28 | B | B | Example |
| C5a | C5a-1 | 35 | 10 | 10% | 0.40 | C | C | Comparative Example |
| C6a | C6a-1 | 48 | 9 | 10% | 0.51 | C | C | Comparative Example |
| D1a | D1a-1 | 30 | 4 | 10% | 0.32 | B | B | Example |
| D2a | D2a-1 | 35 | 7 | 10% | 0.25 | A | A | Example |
| D3a | D3a-1 | 51 | 31 | 10% | 0.46 | C | C | Comparative Example |

TABLE 4B

| Product Sheet No. | Test Piece No. | Surface to 50 μm Average Number Density of Secondary Phase | Surface to 50 μm Difference from Minimum Number Density of Secondary Phase | Forming Test Plastic Strain ε1 | Forming Test Amount ΔPa of Increase in Roughness [μm] | Surface Shape after Forming | Comprehensive Evaluation | Note |
| --- | --- | --- | --- | --- | --- | --- | --- | --- |
| E1a | E1a-1 | 55 | 10 | 10% | 0.10 | A | A | Example |
| E2a | E2a-1 | 85 | 20 | 10% | 0.10 | A | A | Example |
| E3a | E3a-1 | 35 | 4 | 10% | 0.09 | A | B | Example |
| E3b | E3b-1 | 24 | 3 | 10% | 0.07 | A | A | Example |
| E4a | E4a-1 | 28 | 3 | 10% | 0.07 | A | A | Example |
| F1a | F1a-1 | 50 | 12 | 10% | 0.20 | A | A | Example |
| F1b | F1b-1 | 45 | 12 | 10% | 0.18 | A | A | Example |
| F2a | F2a-1 | 15 | 10 | 10% | 0.42 | C | C | Comparative Example |
| G1a | G1a-1 | 70 | 11 | 10% | 0.22 | A | B | Example |
| G2a | G2a-1 | 73 | 16 | 10% | 0.51 | C | C | Comparative Example |
| G3a | G3a-1 | 28 | 8 | 10% | 0.47 | C | C | Comparative Example |
| H1a | H1a-1 | 44 | 8 | 10% | 0.27 | B | B | Example |
| H1b | H1b-1 | 56 | 21 | 10% | 0.48 | C | C | Comparative Example |
| H2a | H2a-1 | 85 | 30 | 10% | 0.35 | C | C | Comparative Example |
| H3a | H3a-1 | 49 | 22 | 10% | 0.46 | C | C | Comparative Example |
| I1a | I1a-1 | 77 | 15 | 10% | 0.23 | A | B | Example |
| I2a | I2a-1 | 98 | 25 | 10% | 0.37 | C | C | Comparative Example |
| J1a | J1a-1 | 35 | 10 | 10% | 0.13 | A | B | Example |
| J2a | J2a-1 | 12 | 3 | 10% | 0.11 | A | A | Example |
| J3a | J3a-1 | 15 | 5 | 10% | 0.14 | A | A | Example |
| J4a | J4a-1 | 20 | 6 | 10% | 0.18 | A | B | Example |
| K1a | K1a-1 | 51 | 7 | 10% | 0.28 | B | B | Example |
| K2a | K2a-1 | 66 | 21 | 10% | 0.29 | B | B | Example |

TABLE 4C

| | | Surface to 50 μm | | Forming Test | | | | |
|---|---|---|---|---|---|---|---|---|
| Product Sheet No. | Test Piece No. | Average Number Density of Secondary Phase | Difference from Minimum Number Density of Secondary Phase | Plastic Strain ε1 | Amount ΔPa of Increase in Roughness [μm] | Surface Shape after Forming | Comprehensive Evaluation | Note |
| K3a | K3a-1 | 47 | 16 | 10% | 0.40 | C | C | Comparative Example |
| K4a | K4a-1 | 39 | 8 | 10% | 0.17 | A | A | Example |
| L1a | L1a-1 | 51 | 11 | 10% | 0.52 | C | C | Comparative Example |
| L2a | L2a-1 | 75 | 18 | 10% | 0.25 | B | B | Example |
| L2b | L2b-1 | 42 | 12 | 10% | 0.16 | A | A | Example |
| L2c | L2c-1 | 77 | 33 | 10% | 0.40 | C | C | Comparative Example |
| M1a | M1a-1 | 118 | 13 | 10% | 0.31 | B | B | Example |
| M2a | M2a-1 | 94 | 6 | 10% | 0.40 | C | C | Comparative Example |
| N1a | N1a-1 | 2 | 2 | 10% | 0.43 | C | C | Comparative Example |
| O1a | O1a-1 | 77 | 18 | 10% | 0.39 | C | C | Comparative Example |
| P1a | P1a-1 | 131 | 21 | 10% | 0.48 | C | C | Comparative Example |
| P2a | P2a-1 | 101 | 29 | 10% | 0.38 | C | C | Comparative Example |
| Q1a | — | 71 | 30 | — | — | D | D | Comparative Example |
| R1a | R1a-1 | — | — | 10% | 0.37 | C | C | Comparative Example |
| S1a | S1a-1 | 65 | 37 | 10% | 0.64 | D | D | Comparative Example |
| S2a | — | 67 | 22 | — | — | D | D | Comparative Example |
| T1a | — | 95 | 27 | — | — | D | D | Comparative Example |
| U1a | — | 60 | 24 | — | — | D | D | Comparative Example |
| U2a | — | 57 | 26 | — | — | D | D | Comparative Example |
| V1a | — | 30 | 5 | — | — | D | D | Comparative Example |
| W1a | W1a-1 | 51 | 15 | 10% | 0.38 | C | C | Comparative Example |
| W2a | W2a-1 | 67 | 44 | 10% | 0.36 | C | C | Comparative Example |
| X1a | X1a-1 | 65 | 30 | 10% | 0.40 | C | C | Comparative Example |
| Z1a | Z1a-1 | 68 | 27 | 10% | 0.43 | C | C | Comparative Example |

INDUSTRIAL APPLICABILITY

A high strength steel sheet in which the occurrence of surface unevenness is suppressed even after various deformation during press forming can be manufactured. Therefore, the industrial applicability is high.

What is claimed is:

1. A steel sheet comprising, as a chemical composition, by mass %:
C: 0.020% to 0.090%;
Si: 0.200% or less;
Mn: 0.45% to 2.10%;
P: 0.030% or less;
S: 0.020% or less;
sol. Al: 0.50% or less;
N: 0.0100% or less;
B: 0% to 0.0050%;
Mo: 0% to 0.40%;
Ti: 0% to 0.10%;
Nb: 0% to 0.10%;
Cr: 0% to 0.55%;
Ni: 0% to 0.25%; and
a remainder of Fe and impurities,
wherein a metallographic structure in a surface layer region ranging from a surface to a position of 20 μm from the surface in a sheet thickness direction consists of ferrite and a secondary phase having a volume fraction of 0.01% to 5.0%,
a metallographic structure in an internal region ranging from a position of more than 20 μm from the surface in the sheet thickness direction to a ¼ thickness position from the surface in the sheet thickness direction consists of ferrite and a secondary phase having a volume fraction of 2.0% to 10.0%,
the volume fraction of the secondary phase in the surface layer region is less than the volume fraction of the secondary phase in the internal region, and
in the surface layer region,
an average grain size of the secondary phase is 0.01 μm to 4.0 μm, and
a texture in which an $X_{ODF\{001\}/\{111\}}$ as a ratio of an intensity of {001} orientation to an intensity of {111} orientation in the ferrite is 0.60 or more and less than 2.00 is included.

2. The steel sheet according to claim 1,
wherein an average grain size of the secondary phase in the internal region is 1.0 μm to 5.0 μm and is more than the average grain size of the secondary phase in the surface layer region.

3. The steel sheet according to claim 2,
wherein in a range of 0 μm to 50 μm from the surface in the sheet thickness direction in a cross section of the steel sheet orthogonal to a rolling direction,
an average number density of the secondary phase per observed viewing field having a length of 100 μm in a sheet width direction and a length of 50 μm in the sheet thickness direction is 130 or less, and
a minimum number density of the secondary phase per the observed viewing field is more than or equal to a value obtained by subtracting 20 from the average number density of the secondary phase.

4. The steel sheet according to claim 2,
wherein the chemical composition includes, by mass %, one or more selected from the group consisting of:
B: 0.0001% to 0.0050%;
Mo: 0.001% to 0.40%;
Ti: 0.001% to 0.10%;
Nb: 0.001% to 0.10%;
Cr: 0.001% to 0.55%; and
Ni: 0.001% to 0.25%.

5. The steel sheet according to claim 2,
wherein the secondary phase in the surface layer region includes one or more selected from the group consisting of martensite, bainite, and tempered martensite.

6. The steel sheet according to claim 2,
wherein a plating layer is provided on the surface.

7. The steel sheet according to claim 2,
wherein a tensile strength is 400 MPa or higher.

8. A method for manufacturing a steel sheet according to claim 1, the method comprising:
a heating process of heating a slab having the chemical composition according to claim 1 at 1000° C. or higher;
a hot-rolling process of hot-rolling the slab such that a rolling finishing temperature is 950° C. or lower to obtain a hot-rolled steel sheet;
a stress application process of applying a stress to the hot-rolled steel sheet after the hot-rolling process such that an absolute value of a residual stress σs on a surface is 150 MPa to 350 MPa;
a cold-rolling process of cold-rolling the hot-rolled steel sheet after the stress application process such that a cumulative rolling reduction $R_{CR}$ is 70% to 90% to obtain a cold-rolled steel sheet;
an annealing process of heating the cold-rolled steel sheet such that an average heating rate in a range from 300° C. to a soaking temperature T1° C. that satisfies the following Expression (1) is 1.5° C./sec to 10.0° C./sec and holding the heated steel sheet at the soaking temperature T1° C. for 30 seconds to 150 seconds for annealing; and a cooling process of cooling the cold-rolled steel sheet after the annealing process to 550° C. to 650° C. such that an average cooling rate in a range from T1° C. to 650° C. is 1.0° C./sec to 10.0° C./sec and cooling the cooled steel sheet to 200° C. to 490° C. such that the average cooling rate is 5.0° C./sec to 500.0° C./sec, $$1275 - 27 \times \ln(\sigma s) - 4.5 \times R_{CR} \leq T1 \leq 1275 - 27 \times \ln(\sigma s) - 4 \times R_{CR} \quad (1).$$

9. The method for manufacturing a steel sheet according to claim 8,
wherein the stress application process is performed at 40° C. to 500° C.

10. The method for manufacturing a steel sheet according to claim 8,
wherein in the hot-rolling process, a finish rolling start temperature is 900° C. or lower.

11. The method for manufacturing a steel sheet according to claim 8, further comprising a holding process of holding the cold-rolled steel sheet after the cooling process in a temperature range of 200° C. to 490° C. for 30 seconds to 600 seconds.

12. A steel sheet comprising, as a chemical composition, by mass %:
C: 0.020% to 0.090%;
Si: 0.200% or less;
Mn: 0.45% to 2.10%;
P: 0.030% or less;
S: 0.020% or less;
sol. Al: 0.50% or less;
N: 0.0100% or less;
B: 0% to 0.0050%;
Mo: 0% to 0.40%;
Ti: 0% to 0.10%;
Nb: 0% to 0.10%;
Cr: 0% to 0.55%;
Ni: 0% to 0.25%; and
a remainder of Fe and impurities,
wherein a metallographic structure in a surface layer region ranging from a surface to a position of 20 μm from the surface in a sheet thickness direction comprises ferrite and a secondary phase having a volume fraction of 0.01% to 5.0%,
a metallographic structure in an internal region ranging from a position of more than 20 μm from the surface in the sheet thickness direction to a ¼ thickness position from the surface in the sheet thickness direction comprises ferrite and a secondary phase having a volume fraction of 2.0% to 10.0%,
the volume fraction of the secondary phase in the surface layer region is less than the volume fraction of the secondary phase in the internal region, and
in the surface layer region,
an average grain size of the secondary phase is 0.01 μm to 4.0 μm, and
a texture in which an $X_{ODF\{001\}/\{111\}}$ as a ratio of an intensity of {001} orientation to an intensity of {111} orientation in the ferrite is 0.60 or more and less than 2.00 is included.

13. The steel sheet according to claim 2,
wherein the chemical composition includes, by mass %, one or more of:
B: 0.0001% to 0.0050%;
Mo: 0.001% to 0.40%;
Ti: 0.001% to 0.10%;
Nb: 0.001% to 0.10%;
Cr: 0.001% to 0.55%; and
Ni: 0.001% to 0.25%.

14. The steel sheet according to claim 2,
wherein the secondary phase in the surface layer region includes one or more of martensite, bainite, and tempered martensite.

15. The steel sheet according to claim 1,
wherein an amount ΔPa is 0.35 μm or less, where the amount ΔPa is an increase in roughness calculated using a roughness Pa of a test piece and a roughness of Pa of the steel sheet, wherein the test piece is prepared by applying plastic strain of 10% in the rolling width direction to the steel sheet, which the roughness of the Pa is measured, in a cylinder drawing forming test with the Marciniak method using a deep drawing tester, a cylindrical punch of φ50 mm, and a cylindrical die of φ54 mm, the Pa of the test piece is measured by measuring an arithmetic mean height Pa of a profile curve defined by JIS B0601 (2001) of the test piece for a portion, where the plastic strain is applied in a direction orthogonal to a rolling direction having a length of 30 mm, according to JIS B0633 (2001), the Pa of the steel sheet is measured by measuring an arithmetic mean height Pa of a profile curve defined by JIS B0601 (2001) of the steel sheet obtained from a flat portion of the steel sheet in the direction orthogonal to the rolling direction having a length of 30 mm, according to JIS B0633 (2001), and the amount ΔPa is obtained by subtracting the Pa of the steel sheet from the Pa of the test piece.

16. The steel sheet according to claim 1, wherein the metallographic structure in an internal region ranging from a position of more than 20 μm from the surface in the sheet thickness direction to a ¼ thickness position from the surface in the sheet thickness direction consists of ferrite and a secondary phase having a volume fraction of 2.0% to 8.0%.

* * * * *